US011187347B2

(12) United States Patent
Morris et al.

(10) Patent No.: US 11,187,347 B2
(45) Date of Patent: Nov. 30, 2021

(54) DRAIN VALVE

(71) Applicant: Triteck Limited, Kowloon (HK)

(72) Inventors: Peter J. Morris, Canning Vale (AU);
Garry R. White, South Perth (AU)

(73) Assignee: AUSTRALIAN VALVE GROUP PTY LTD, Kewdale (AU)

( * ) Notice: Subject to any disclaimer, the term of this patent is extended or adjusted under 35 U.S.C. 154(b) by 0 days.

(21) Appl. No.: 15/874,622

(22) Filed: Jan. 18, 2018

(65) Prior Publication Data
US 2018/0202574 A1   Jul. 19, 2018

(30) Foreign Application Priority Data

Jan. 18, 2017   (AU) ................................ 2017900150

(51) Int. Cl.
| | | |
|---|---|---|
| F16K 31/50 | (2006.01) | |
| F24H 9/00 | (2006.01) | |
| F16K 1/04 | (2006.01) | |
| F16K 31/52 | (2006.01) | |
| F16K 1/12 | (2006.01) | |

(52) U.S. Cl.
CPC .............. *F16K 31/508* (2013.01); *F16K 1/04* (2013.01); *F16K 1/12* (2013.01); *F16K 31/52* (2013.01); *F24H 9/0042* (2013.01)

(58) Field of Classification Search
CPC ... F16K 31/52; F16K 1/04; F16K 1/12; F16K 31/508; F24H 9/0042
USPC ........................................ 251/336, 347, 344
See application file for complete search history.

(56) References Cited

U.S. PATENT DOCUMENTS

| | | | | |
|---|---|---|---|---|
| 1,630,677 A | * | 5/1927 | Staley | ..................... B08B 9/047 |
| | | | | 15/104.12 |
| 3,103,341 A | * | 9/1963 | Moran | ....................... F16K 1/00 |
| | | | | 251/115 |
| 3,552,427 A | * | 1/1971 | Jacobson | ................. F16K 27/08 |
| | | | | 137/382 |
| 3,559,952 A | * | 2/1971 | Skinner | .................. F16K 31/445 |
| | | | | 251/347 |
| 3,655,164 A | * | 4/1972 | Hayes | ....................... B05B 1/12 |
| | | | | 251/347 |
| 3,765,450 A | * | 10/1973 | Meges | ...................... F16K 1/14 |
| | | | | 137/596.2 |
| 4,391,295 A | * | 7/1983 | Stipe | ................... F16K 27/0209 |
| | | | | 122/14.31 |

(Continued)

*Primary Examiner* — Angelisa L. Hicks
(74) *Attorney, Agent, or Firm* — Miller Nash LLP

(57) ABSTRACT

A drain valve comprising a body, an inlet for fluid to enter the drain valve, an outlet for fluid to exit the drain valve, a piston member having a piston head and a piston shaft, a seat against which the piston head seats in a closed condition of the drain valve, and a rotatable member that is rotatable relative to the body. The rotatable member is rotatably retained with the piston shaft, such that rotation of the rotatable member in one direction causes the piston member to move in a first linear direction away from the inlet such that the valve head is unseated from the seat to open the drain valve and, in use, allow fluid to enter the drain valve via the inlet and discharge via the outlet. Rotation of the rotatable member in the opposite direction causes the piston member to move in a second linear direction toward the inlet to seat the valve head on the valve seat to close the drain valve and, in use, prevent fluid from entering the drain valve via the inlet.

7 Claims, 21 Drawing Sheets

(56) References Cited

U.S. PATENT DOCUMENTS

| | | | | |
|---|---|---|---|---|
| 5,975,491 | A * | 11/1999 | Mann | F16L 37/30 137/614.05 |
| 7,793,679 | B2 * | 9/2010 | Murphy | F16K 27/065 137/15.22 |
| 2002/0030173 | A1 * | 3/2002 | Robison | F16K 1/34 251/368 |
| 2010/0090150 | A1 * | 4/2010 | Readman | F16L 37/122 251/325 |
| 2015/0034171 | A1 * | 2/2015 | Morris | F16K 17/048 137/15.17 |

* cited by examiner

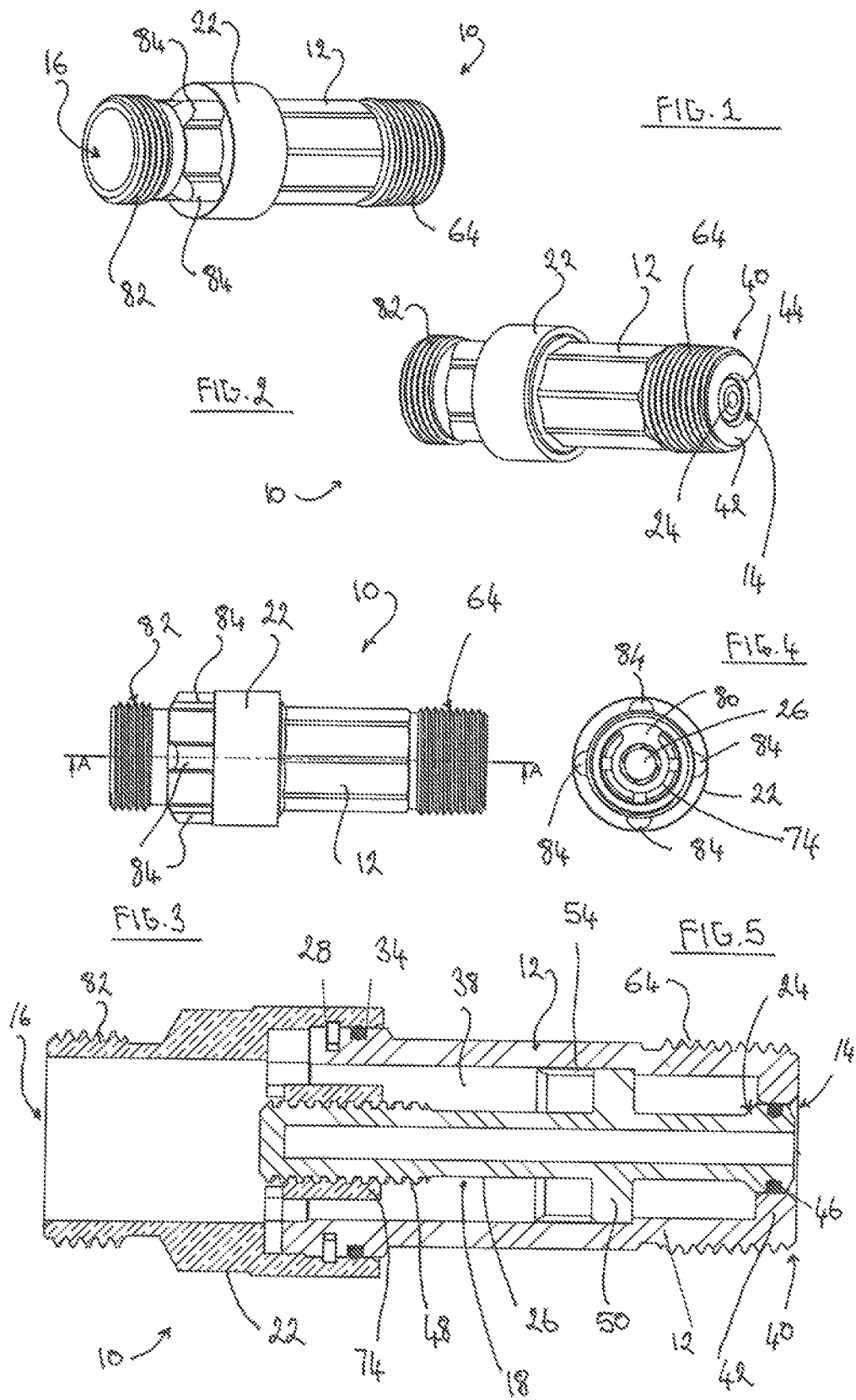

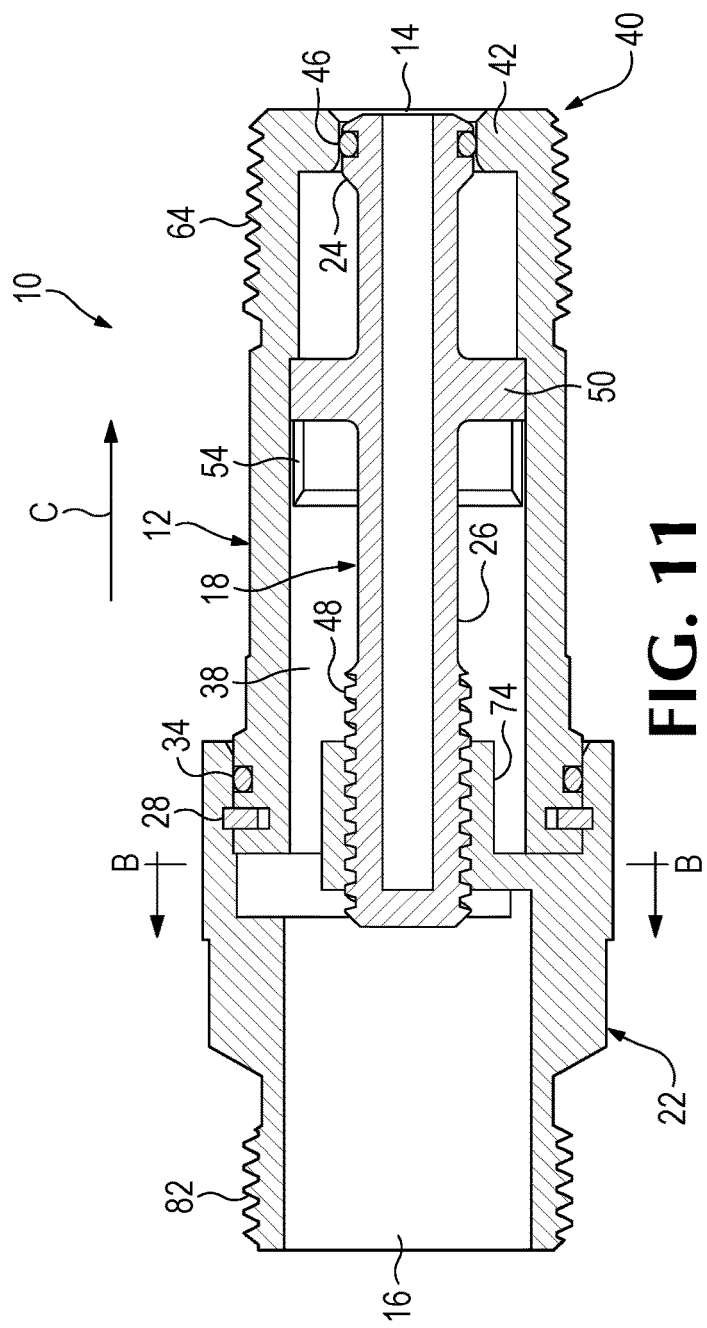
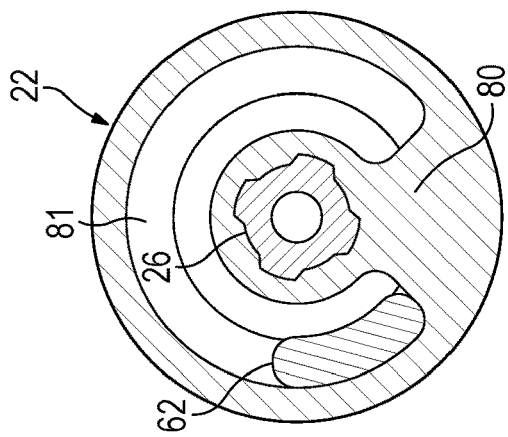
FIG. 11
FIG. 12

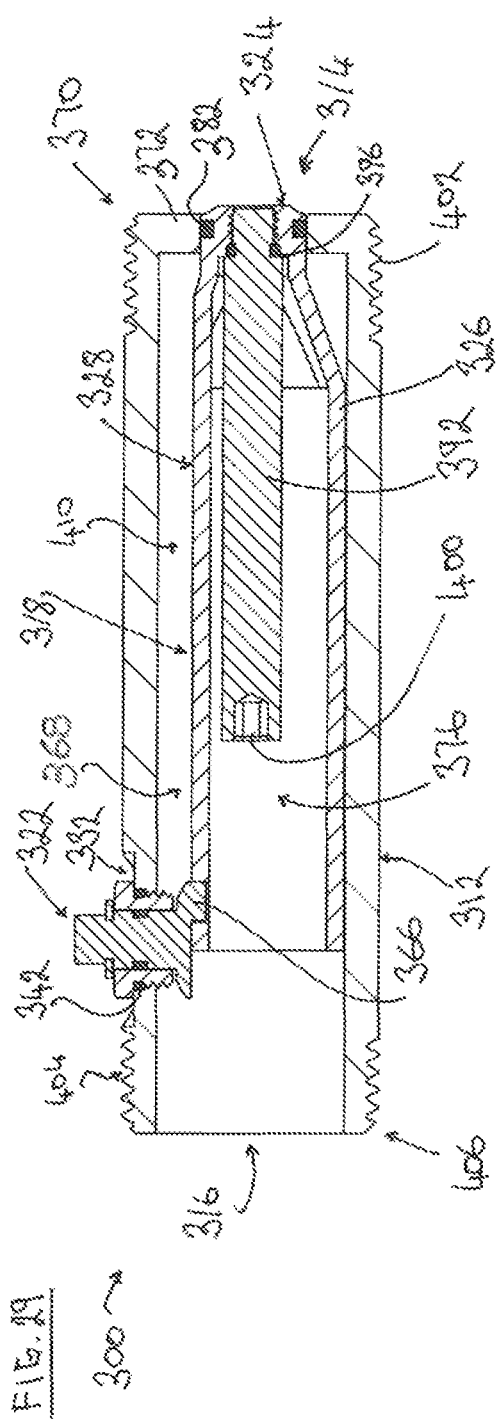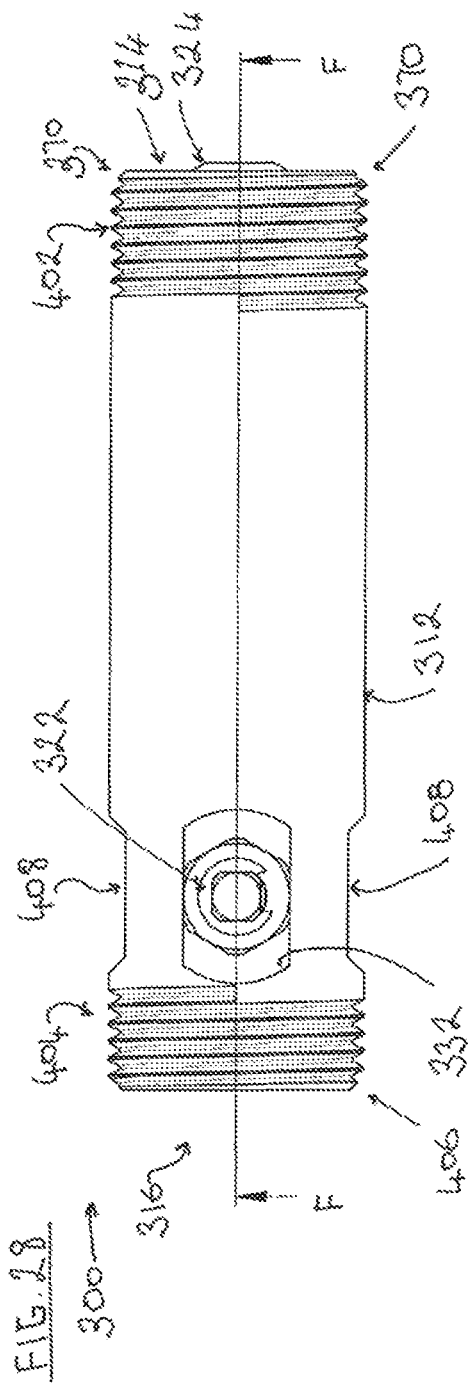

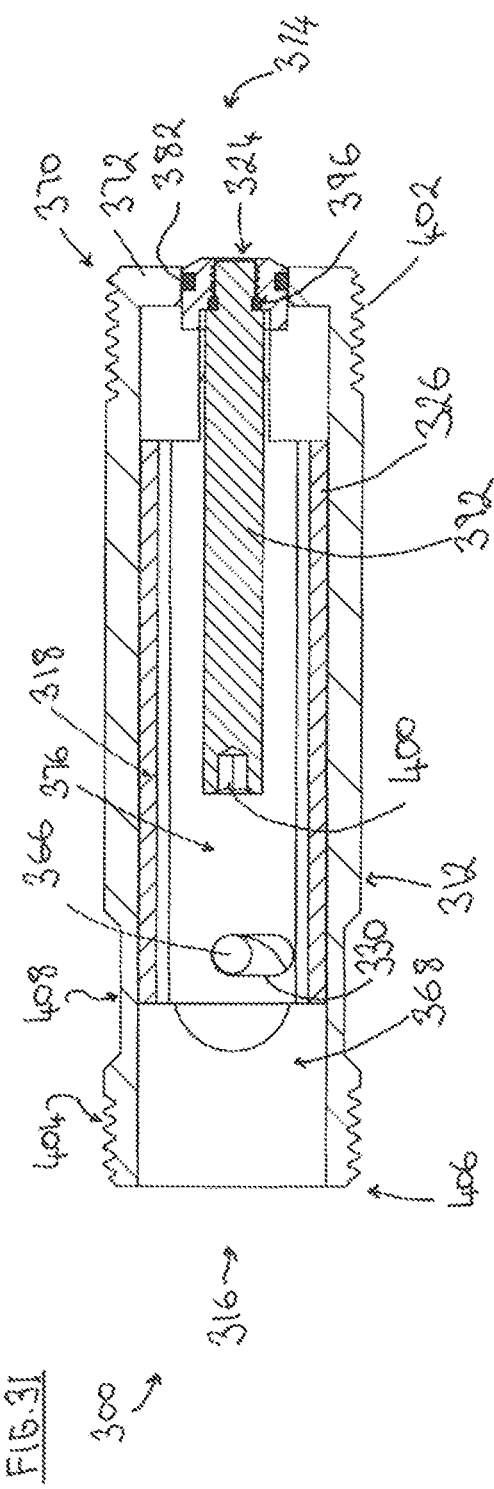

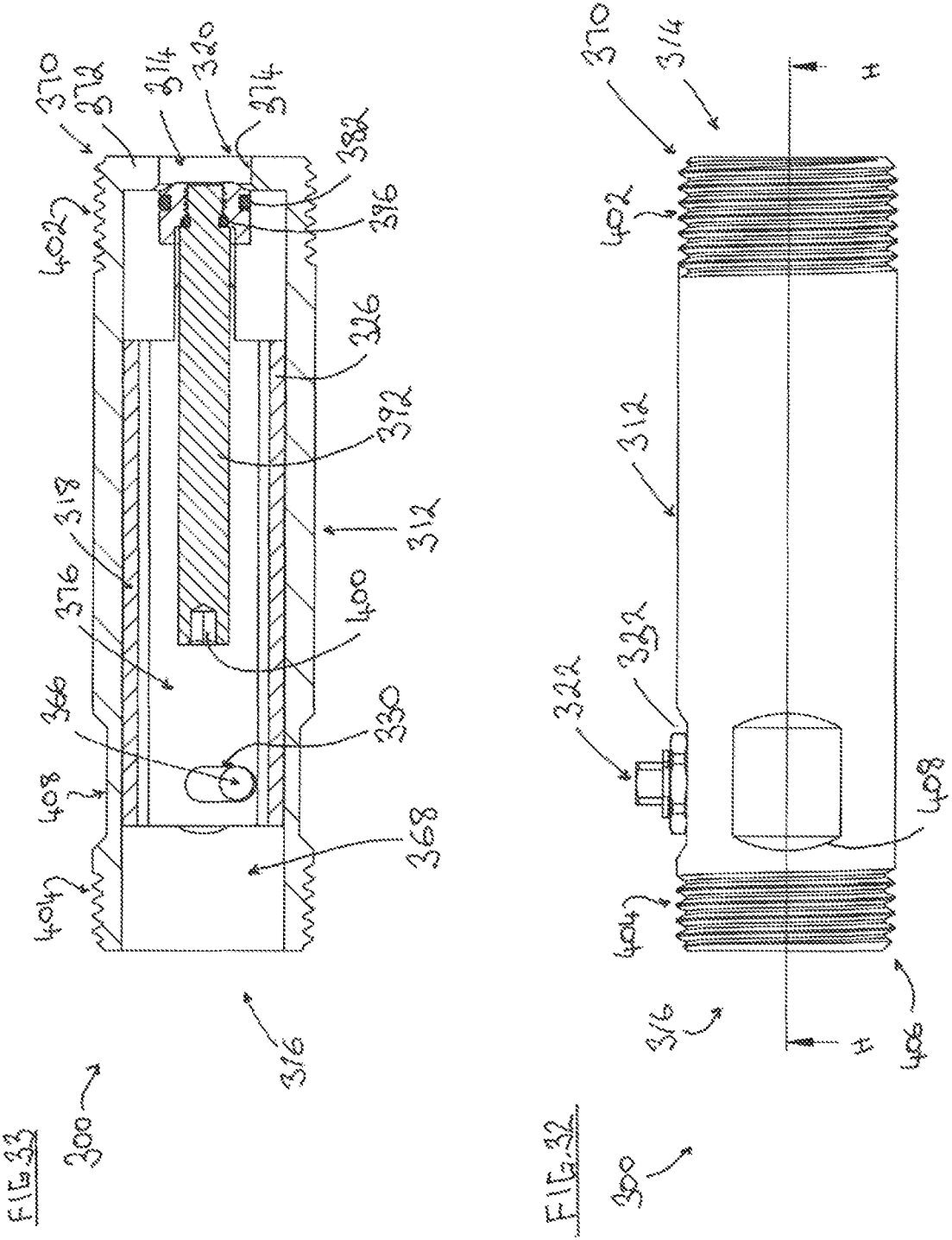

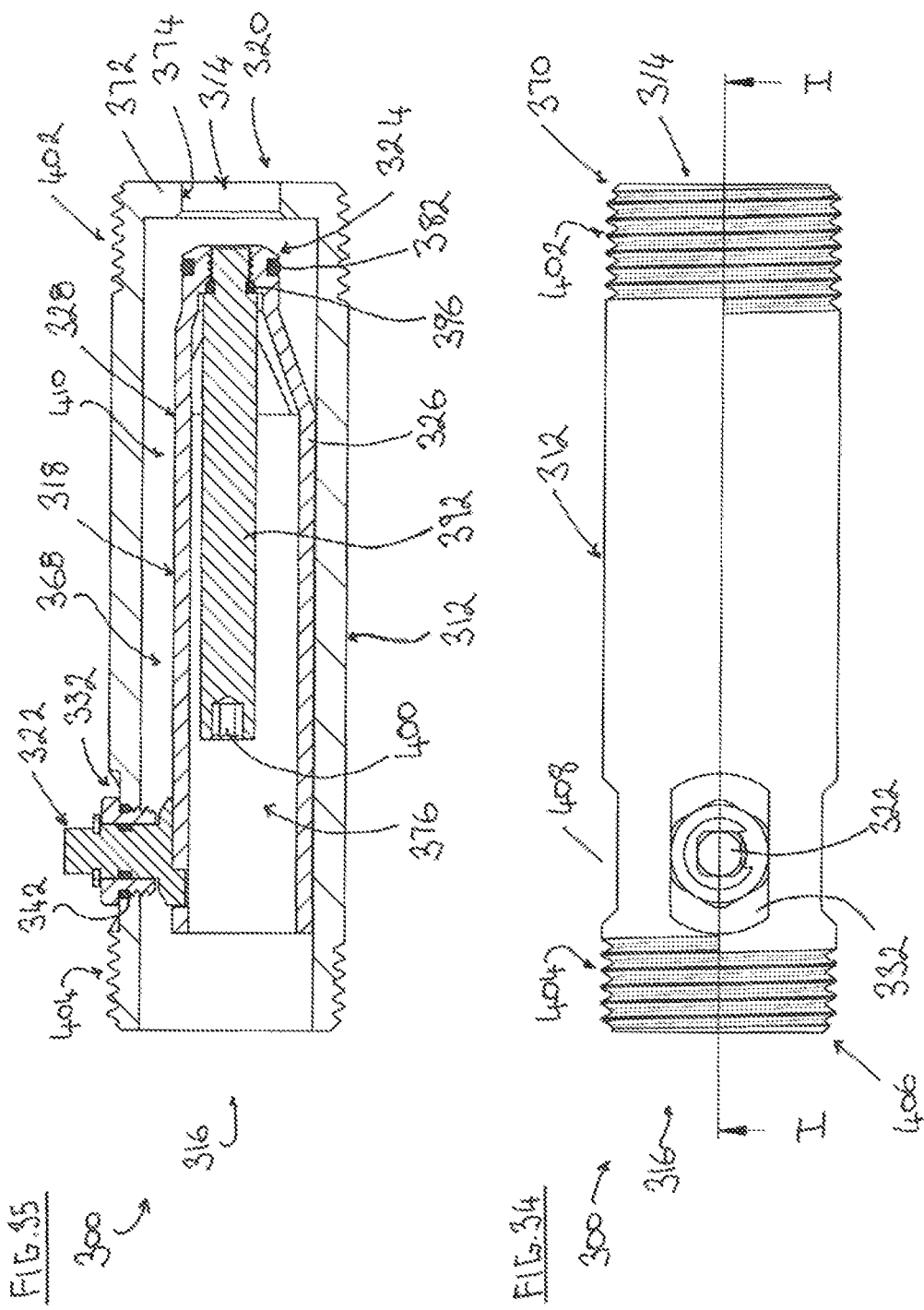

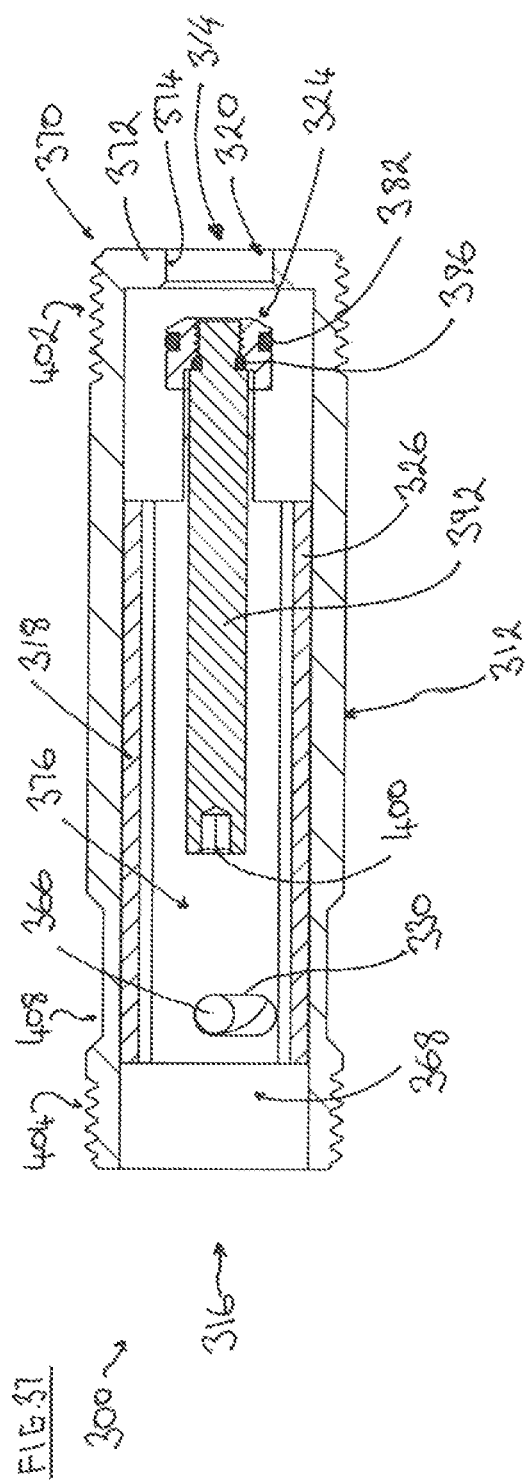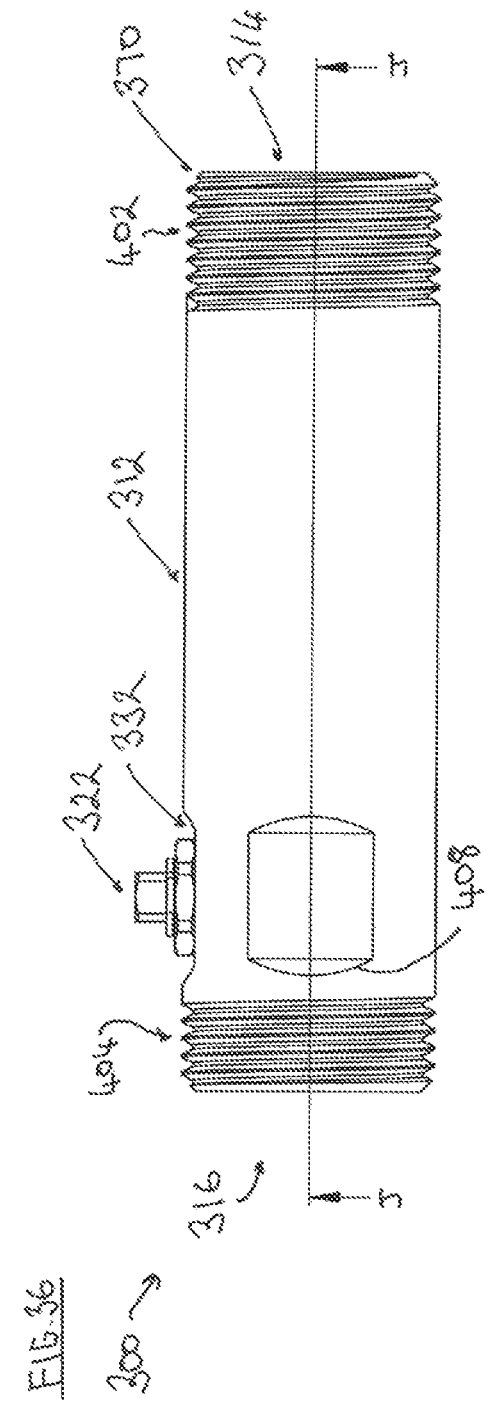

DRAIN VALVE

CROSS-REFERENCE TO RELATED APPLICATIONS

This patent application claims the benefit of Australian Provisional Patent Application No. 2017900150, filed Jan. 18, 2017, and entitled DRAIN VALVE, the disclosure of which is incorporated herein by reference in its entirety.

TECHNICAL FIELD

Throughout this specification, unless the context requires otherwise, the word "comprise" and variations such as "comprises", "comprising" and "comprised" are to be understood to imply the presence of a stated integer or group of integers but not the exclusion of any other integer or group of integers.

Throughout this specification, unless the context requires otherwise, the word "include" and variations such as "includes", "including" and "included" are to be understood to imply the presence of a stated integer or group of integers but not the exclusion of any other integer or group of integers.

BACKGROUND ART

The following discussion of the background art is intended to facilitate an understanding of the present invention only. It should be appreciated that the discussion is not an acknowledgement or admission that any of the material referred to was part of the common general knowledge as at the priority date of the application.

Hot water storage units are used in domestic, commercial and other installations to store water that has been heated by a heater to produce heated water or hot water. The hot water is contained within a sealed vessel, or cylinder, of the hot water storage unit. The vessel is enclosed by an outer casing, which forms the exterior of the hot water storage unit. Various types and arrangements of heaters may be used for heating the water. In some systems, the heater may be provided inside the vessel, e.g. electrically powered heaters that employ heating elements inside the vessel to heat the water. In gas-powered systems, a gas burner is provided outside and beneath the vessel, inside the outer casing, to heat water in the vessel. In other systems, the heater may be provided outside the vessel and the outer casing, e.g. solar hot water systems and heat pump systems may employ such an arrangement.

The majority vessels, or cylinders, in hot water storage units are constructed from steel and then coated internally with an enamel lining to prevent the steel from corroding and eventually causing the vessel to leak. To help protect the enamel lined steel vessel from corrosion, it is fitted with a sacrificial anode, typically made of magnesium or aluminium. As the term "sacrificial" implies, the magnesium/aluminium anode is consumable and over time disintegrates. The debris resulting from the disintegration of the anode settles onto the bottom of the vessel. The anode debris along with any impurities from the cold water supply feeding the vessel of the hot water storage unit can form a sludge build-up and eventually prevents the anode from protecting the vessel.

To prolong the life of the vessel of the hot water storage water storage unit, it is recommended that this sludge is flushed out of the vessel on a regular basis. For this purpose, a drain is provided at the lowest point of a hot water storage unit. The drain allows ease of flushing any sludge build-up from the bottom of the vessel by manually operating the drain, to thereby drain water from the vessel. The water is drained until the water being drained runs clear, indicating that no further sludge is exiting the vessel from the drain. The drain also permits the vessel to be drained of water in the event that servicing of the vessel requires this or if the vessel requires replacement.

In early hot water storage units, the drain was provided as a drain opening in the vessel that normally was closed by a drain plug. To drain water and sludge build-up from the vessel, the drain plug was removed. After sufficient water had been drained from the vessel, the drain plug was reinserted into the drain opening. However, this arrangement did not provide much control of the draining operation and was replaced by a drain valve fitted to the hot water storage unit to control the flow of water and suitably direct the water when it was necessary to drain water from the vessel.

Traditional drain valves are designed such that when fitted to a hot water storage unit, a substantial portion of the drain valve is located outside the outer casing of the hot water storage unit.

However, having a substantial portion of the drain valve located outside the outer casing of the hot water storage unit is disadvantageous because the external drain valve acts as a heat sink and a source of heat loss from the heated water inside the vessel, through the body of drain valve, and to the ambient air outside the outer casing.

Hot water storage unit manufacturers worldwide continue to strive to maximise efficiencies and minimise heat losses.

SUMMARY OF INVENTION

In accordance with one aspect of the present invention there is provided a drain valve comprising
   a body,
   an inlet for fluid to enter the drain valve,
   an outlet for fluid to exit the drain valve,
   a piston member having a piston head and a piston shaft, a
   a seat, against which the piston head seats in a closed condition of the drain valve, and
   a rotatable member that is rotatable relative to the body, the rotatable member rotatably retained with the piston shaft, such that rotation of the rotatable member in a first direction causes the piston shaft to move in a first linear direction away from the inlet such that the valve head is unseated from the seat to open the drain valve and, in use, allow fluid to enter the drain valve via the inlet and discharge via the outlet, and rotation of the rotatable member in a second opposite direction causes the piston member to move in a second linear direction toward the inlet to seat the valve head on the valve seat to close the drain valve and, in use, prevent fluid from entering the drain valve via the inlet.

The rotatable member may comprise a collar.

Preferably, the collar is connected with the body of the drain valve such that the collar is rotatable relative to the body.

Preferably, the piston shaft is provided with at least one spoke extending radially therefrom and the body is provided with at least one guide slot, wherein the spoke is received in the guide slot such that the piston shaft cannot rotate.

Preferably, the body is provided with an arcuate projection and the collar is provided with an arcuate track, wherein the arcuate projection is received in the arcuate track and rotation of the collar stops when the arcuate projection abuts with a surface at respective ends of the arcuate track.

In an alternative, the rotatable member may comprise a spindle.

Preferably, the piston shaft is provided with an opening and the spindle comprises a projection that engages in the opening in the piston shaft such that rotation of the spindle in the first direction causes the piston member to move in the first linear direction to open the drain valve, and rotation of the spindle in the second direction causes the piston member to move in the second linear direction to close the drain valve.

Preferably, the spindle is rotatably held by a grommet that is detachably connected to the body of the drain valve.

Preferably, the piston shaft comprises a flat surface and the opening in the piston shaft is provided in the flat surface.

Preferably, the piston head is provided with a bore and the piston member further comprises a plug, such that the plug is detachably connected with the piston head to close the bore.

Preferably, openings are provided in the piston member between the piston head and the piston shaft for passage of fluid.

In accordance with another aspect of the present invention there is provided a drain valve comprising
a body,
an inlet for fluid to enter the drain valve,
an outlet for fluid to exit the drain valve,
a piston member having a piston head and a piston shaft,
a
a seat, against which the piston head seats in a closed condition of the drain valve, and
a collar rotatable relative to the body, the collar engaging with a screw thread on the piston shaft, such that rotation of the collar in one direction causes the piston member to move in a first linear direction away from the inlet such that the valve head is unseated from the seat to open the drain valve and, in use, allow fluid to enter the drain valve via the inlet and discharge via the outlet, and rotation of the collar in the opposite direction causes the piston member to move in a second linear direction toward the inlet to seat the valve head on the valve seat to close the drain valve and, in use, prevent fluid from entering the drain valve via the inlet.

In accordance with another aspect of the present invention there is provided a drain valve comprising
a body,
an inlet for fluid to enter the drain valve,
an outlet for fluid to exit the drain valve,
a piston member having a piston head and a piston shaft,
a
a seat, against which the piston head seats in a closed condition of the drain valve, and
a spindle rotatable relative to the body, the spindle engaging with an opening in the piston shaft, such that rotation of the spindle in one direction causes the piston member to move in a first linear direction away from the inlet such that the valve head is unseated from the seat to open the drain valve and, in use, allow fluid to enter the drain valve via the inlet and discharge via the outlet, and rotation of the spindle in the opposite direction causes the piston member to move in a second linear direction toward the inlet to seat the valve head on the valve seat to close the drain valve and, in use, prevent fluid from entering the drain valve via the inlet.

In accordance with another aspect of the present invention there is provided a hot water storage unit comprising
a vessel, in which hot water is storable,
an outer casing enclosing the vessel,
insulation material provided between the vessel and the outer casing,
a hot water outlet for heated water to exit from inside the vessel,
a drain valve, as herein before described, in use, to selectively allow water to be drained from the vessel,
wherein the body of the drain device is located substantially behind the outer casing on the inner side of the outer casing to provide insulation to the body of the drain valve.

Preferably, the inlet of the drain valve is provided substantially adjacent to the hot water outlet of the vessel.

BRIEF DESCRIPTION OF DRAWINGS

The present invention will now be described, by way of example only, with reference to the accompanying drawings, in which:

FIG. 1 is a first perspective view of an embodiment of a drain valve in accordance with one aspect of the present invention;

FIG. 2 is a second perspective view of the drain valve shown in FIG. 1;

FIG. 3 is a side view of the drain valve shown in FIG. 1;

FIG. 4 is an end view of the drain valve shown in FIG. 1;

FIG. 5 is a first cross sectional side view of the drain valve taken along the line A-A in FIG. 3, with the drain valve in the closed condition;

FIG. 11 is a second cross sectional side view of the drain valve taken along the line A-A in FIG. 3, with the drain valve in the closed condition;

FIG. 12 is a cross sectional view of the drain valve taken along the line B-B in FIG. 11;

FIG. 28 is a top view of the drain valve shown in FIG. 20, in assembled condition, with the drain valve in the closed condition;

FIG. 29 is a cross sectional view of the drain valve taken along the line F-F in FIG. 28;

FIG. 30 is a side view of the drain valve shown in FIG. 20, in assembled condition, with the drain valve in the closed condition;

FIG. 31 is a cross sectional view of the drain valve taken along the line G-G in FIG. 30;

FIG. 32 is a side view of the drain valve shown in FIG. 20, in assembled condition, with the drain valve in a partly open condition;

FIG. 33 is a cross sectional view of the drain valve taken along the line H-H in FIG. 32;

FIG. 34 is a top view of the drain valve shown in FIG. 20, in assembled condition, with the drain valve in the open condition;

FIG. 35 is a cross sectional view of the drain valve taken along the line I-I in FIG. 34;

FIG. 36 is a side view of the drain valve shown in FIG. 20, in assembled condition, with the drain valve in the open condition;

FIG. 37 is a cross sectional view of the drain valve taken along the line J-J in FIG. 36.

DESCRIPTION OF EMBODIMENTS

Figure 6:
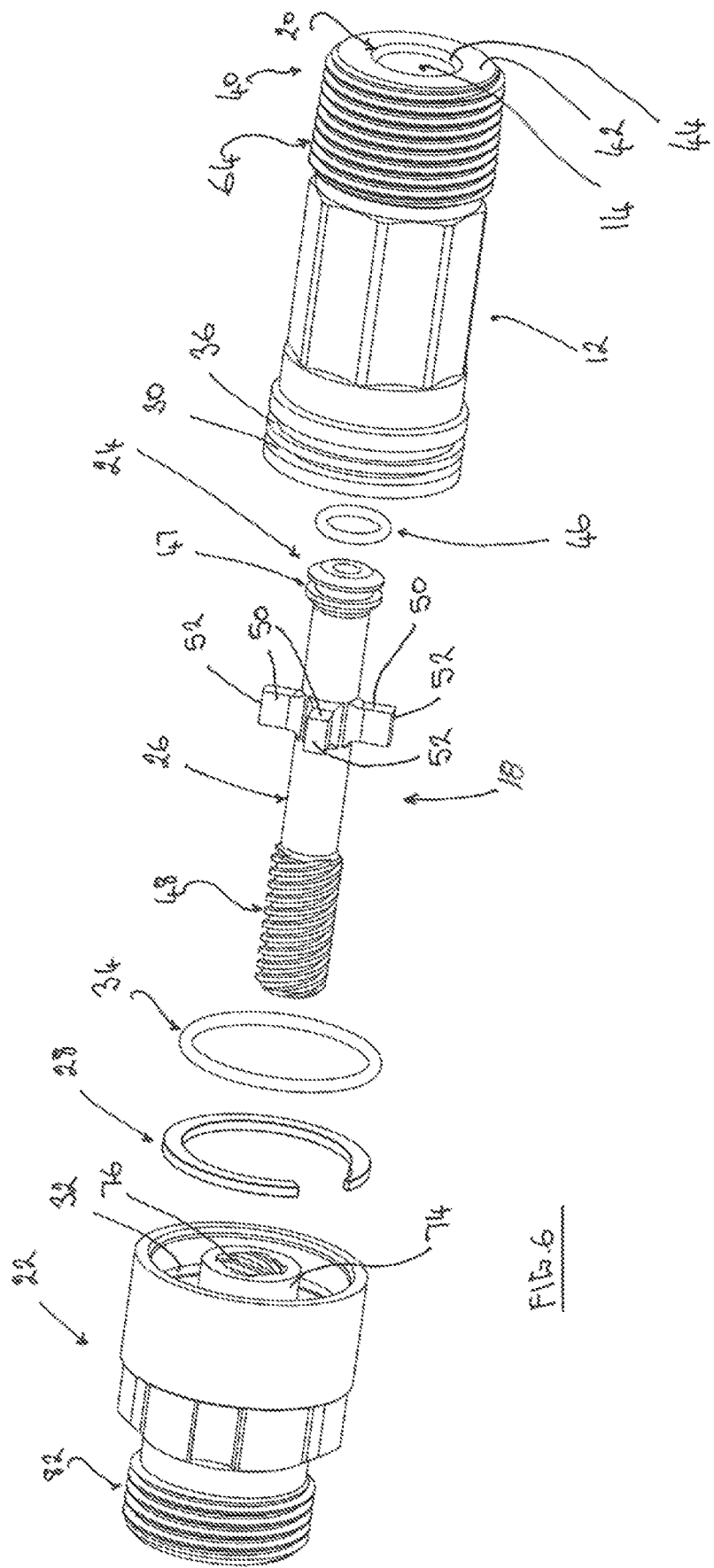
FIG. 6 is an exploded perspective view of the drain valve shown in FIG. 1.
Figure 7:
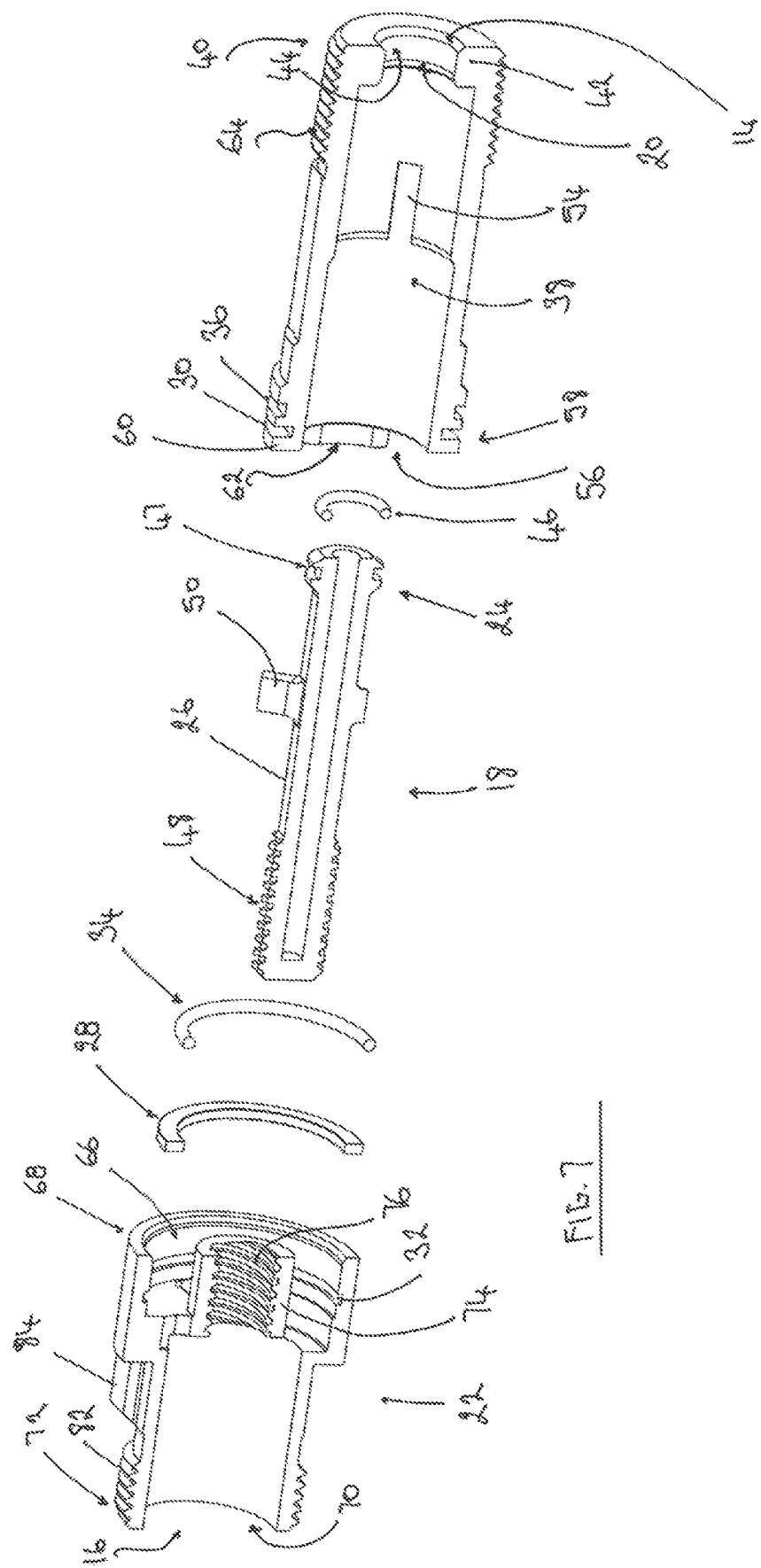
FIG. 7 is a cross sectional exploded perspective view of the drain valve shown in FIG. 1.

The same reference numerals are used to denote the same or equivalent parts in the embodiments described herein. Such parts that are described with reference to one or more embodiments will not again be described with reference to the other embodiments described herein. It is to be understood that the description of such parts and their operation with reference to such one or more embodiment/s also applies to the other embodiment/s.

In FIGS. 1 to 14, there is shown a drain valve 10 and various components of the drain valve 10. The drain valve 10 comprises a body, or housing, 12, an inlet 14 for fluid to enter the drain valve 10, an outlet 16 for fluid to exit the drain valve 10, a piston member 18, a seat 20 and a rotatable member in the form of a collar 22. The piston member 18 comprises a piston head 24 and a piston shaft, or stem, 26. The piston head 24 seats against the seat 20 in a closed condition of the drain valve 10. The piston head 24 is unseated from (i.e. spaced from) the seat 20 in an open condition of the drain valve 10.

The body 12 and collar 22 are substantially tubular in shape, with the body 12 being longer than the collar 22. The body 12 and collar 22 are joined, or retained, together such that the collar is rotatable relative to the body 12. In particular, the body 12 and collar 22 may be joined, or retained, together by a circlip 28 provided between the body 12 and collar 22. The circlip 28 may be provided in a respective grooves 30 and 32 of the body 12 and the collar 22. A seal (such as an O-ring) 34 is provided between the body 12 and collar 22. The seal 34 may be provided in a groove 36 of the body 12.

The body 12 has a chamber 38. The chamber 38 is provided internally of the body 12 and forms an internal space. The piston member 18 is provided in the chamber 38. In this way, the body 12 provides a housing for the piston member 18.

The body 12 is provided with the inlet 14. The inlet 14 is provided at a first end 40 of the body 12. An annular formation 42 is provided at the first end 40 of the body 12. The annular formation 42 is integral with the body 12. The annular formation 42 may alternatively be described as an inwardly turned flange. The inlet 14 is provided as the opening of the annular formation 42.

The seat 20 is provided proximate to the inlet 14 of the drain valve 10.

In particular, the body 12 is provided with the seat 20. The seat 20 may be formed by the circular surface 44 of annular formation 42 of the body 12 such that the seat 20 is directly adjacent to the inlet 14.

The piston head 24 is provided proximate a first end of the piston shaft 26. The piston head 24 is provided with a seal 46. The seal 46 is in the form of an O-ring located in a groove 47 on the piston head 24. The seal 46 contacts the circular surface 44 annular formation 42 when the piston head 24 seats on the seat 20.

A (male) screw thread 48 is provided on the piston shaft 26. The screw thread 48 extends from the second end of the piston shaft 26, that is remote from the first end of the piston shaft 26, about a third of the length of the piston shaft 26. The screw thread 48 has four thread starts 48*a*, 48*b*, 48*c* and 48*d*, best seen in FIG. 8.

Blades, or spokes, 50 extending radially from the piston shaft 26. The blades 50 extend from the piston shaft 26 at a location on the piston shaft 26 that is closer to the first end (at which the piston head 24 is provided) than the second end of the piston shaft 26. In the drawings, four such blades 50 are shown. The distal ends 52 of the blades 50 are received in respective guide slots 54 that are provided in the internal wall of the body 12 surrounding the chamber 38.

An opening 56 is provided at the second end 58 of the body 12, which is opposed to the first end 40. The body 12 is provided with a flange 60 at the second end 58 around the opening 56. An arcuate projection 62 extends from the flange 60. The arcuate projection 62 forms a stop, as will be further herein described.

A (male) screw thread 64 is provided on the exterior of the body 12, adjacent to the inlet 14, and extends from the first end 40, part way along the body 12. The screw thread 64 is used to connect the drain valve 10 to a hot water storage unit as will be further herein described.

The collar 22 has a first opening 66 at its first end 68 and a second opening 70 at its second end 72. The second opening 70 of the collar 22 forms the outlet 16 of the drain valve 10, such that the collar 22 is provided with the outlet 16.

A sleeve 74 with an internal (female) screw thread 76 is provided in the collar 22. The sleeve 74 is coaxial with the collar 22. The sleeve 74 is joined to the inside wall 78 of the collar 22 by a weblike element 80. The weblike element 80 has a pair of surfaces 80*a* and 80*b*. The surfaces 80*a* and 80*b* are curved. An arcuate track 81 is formed along the inside wall 78 between the surfaces 80*a* and 80*b*.

The screw thread 48, on the piston shaft 26, engages with the screw thread in the sleeve 74.

The arcuate projection 62 of the body 12 is received in the arcuate track 81 of the collar 22.

A (male) screw thread 82 is provided on the exterior of the collar 22 and extends from the second end 72, part way along the collar 22. The screw thread 82 is used to connect the collar 22 of the drain valve 10 to an external hose or fitting to direct away water exiting the drain valve 10.

Lugs 84 may be provided on the exterior of the collar 22. The lugs 84 are provided to enable the collar to be gripped to rotate the collar 22, as will be further herein described.

The collar 22 may be made of brass. The body 12 and piston member 18 of the drain valve 10 may be made of polymer or other suitable plastics material. The seals 34 and 46 may be silicone seals.

Figure 17:
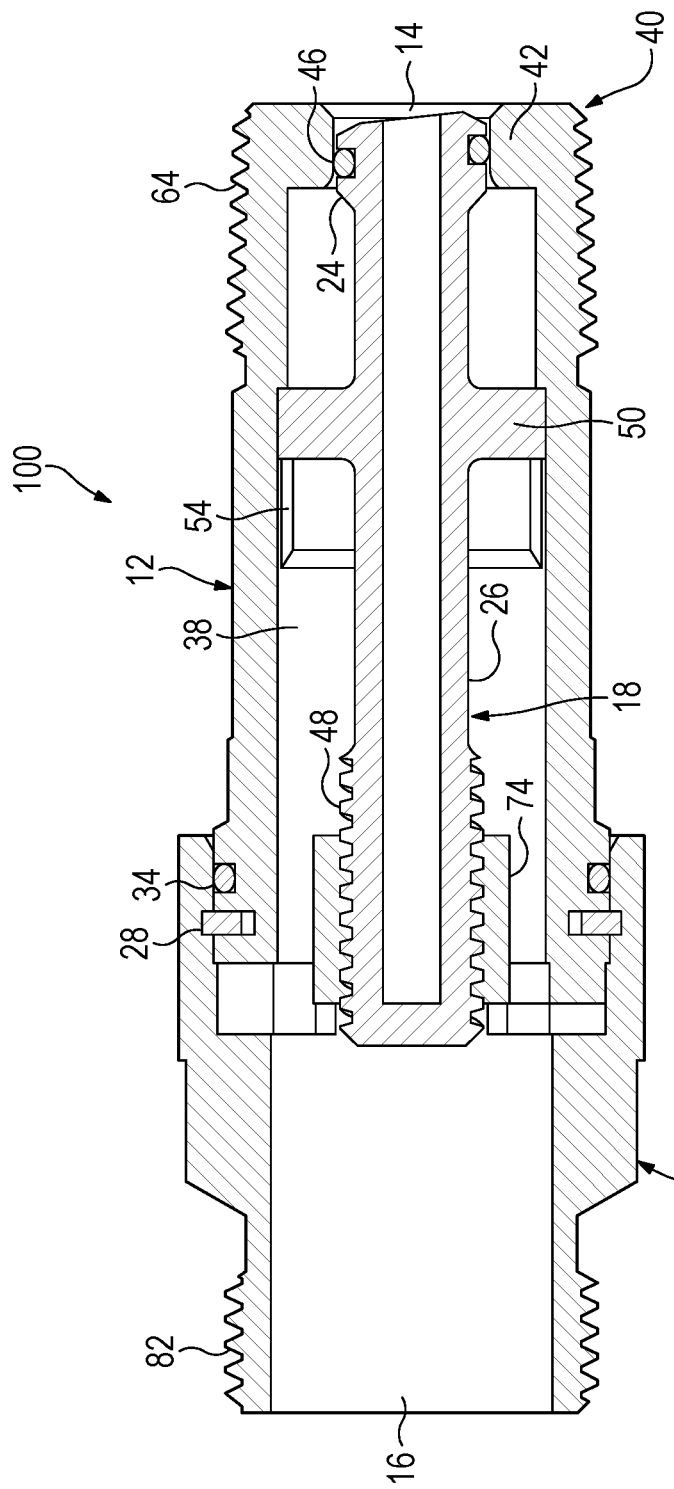
FIG. 17 is a first cross sectional side view of another embodiment of a drain valve, with the drain valve in the closed condition.
Figure 18:
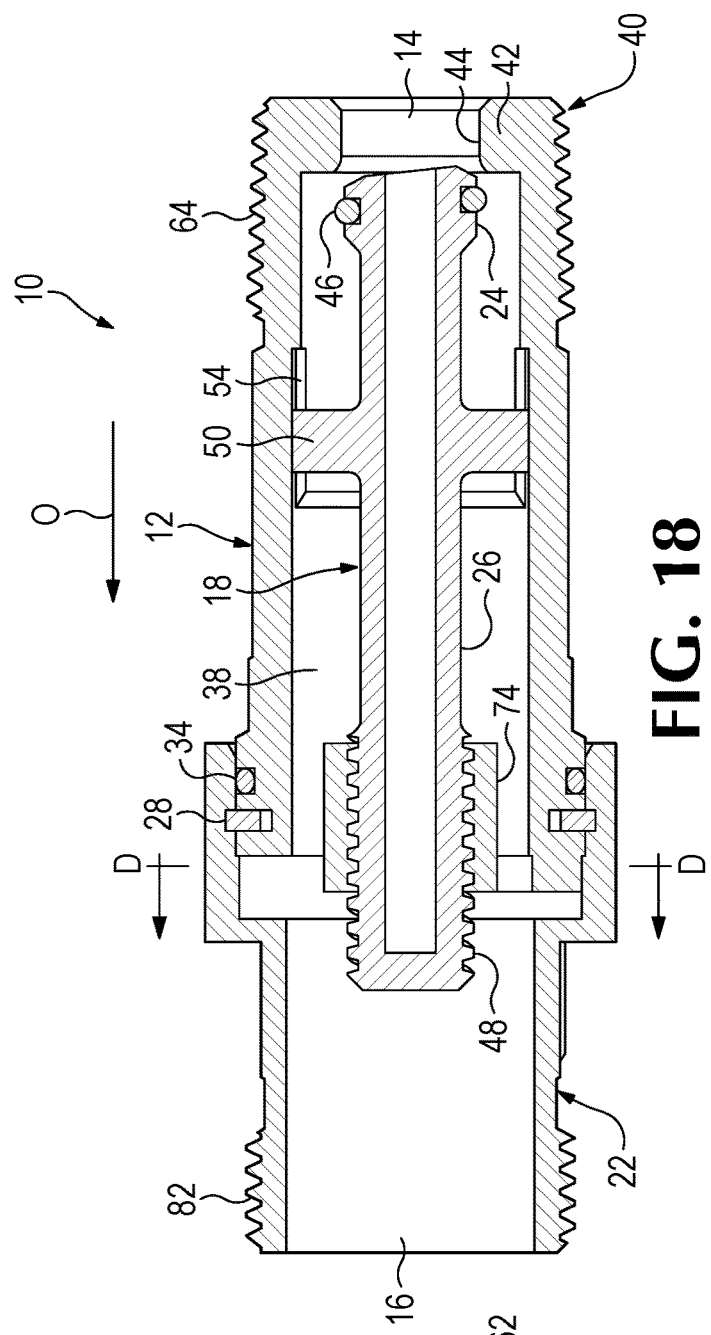
FIG. 18 is a second cross sectional side view of the drain valve, shown in FIG. 17, with the drain valve in the open condition.
Figure 19:
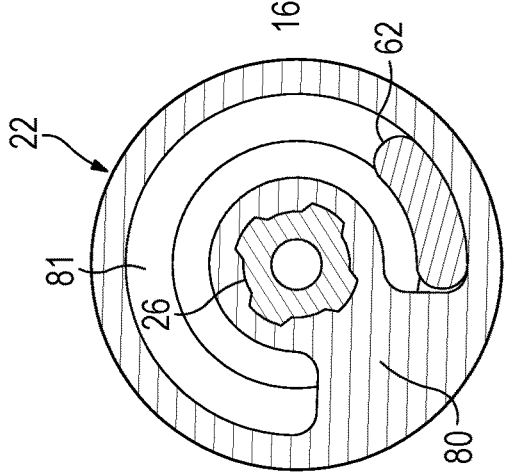
FIG. 19 is a cross sectional view of the drain valve taken along the line D-D in FIG. 18.
Figure 20:
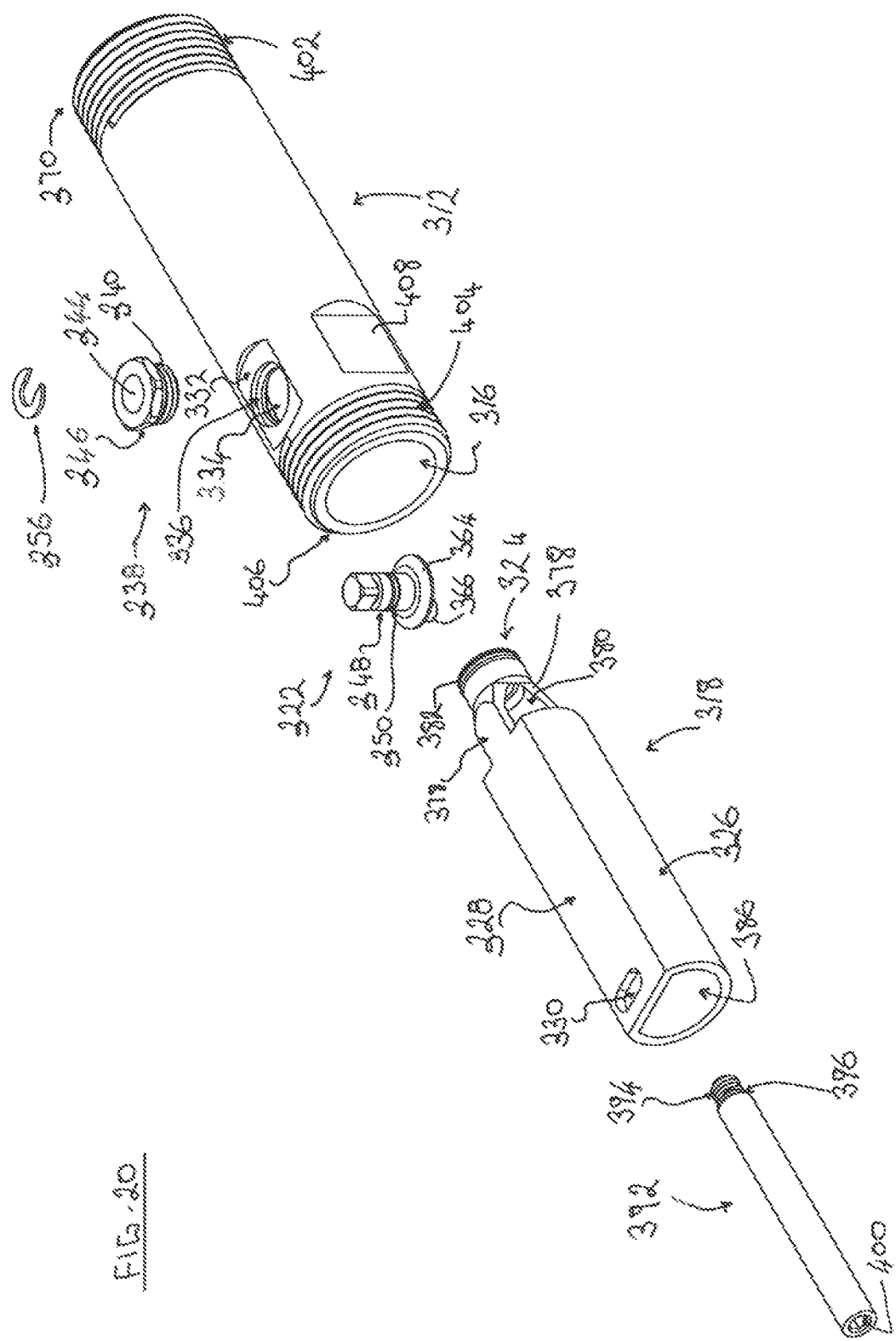
FIG. 20 is an exploded perspective view of a third embodiment of a drain valve in accordance with one aspect of the present invention.
Figure 21:
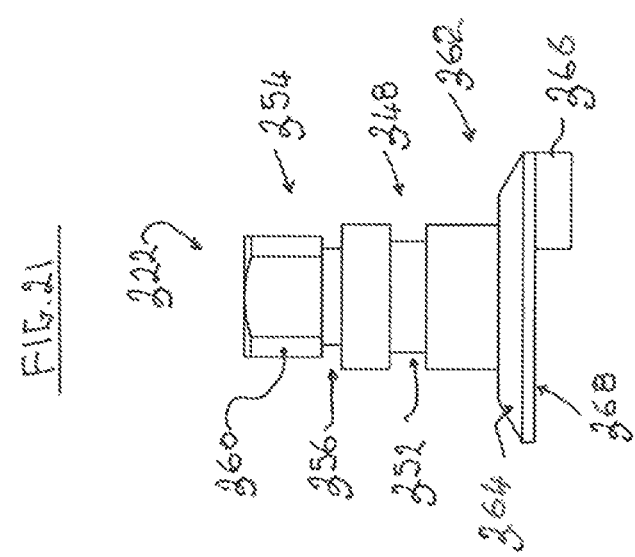
FIG. 21 is a side view of the cam member of the drain valve shown in FIG. 20.
Figure 22:
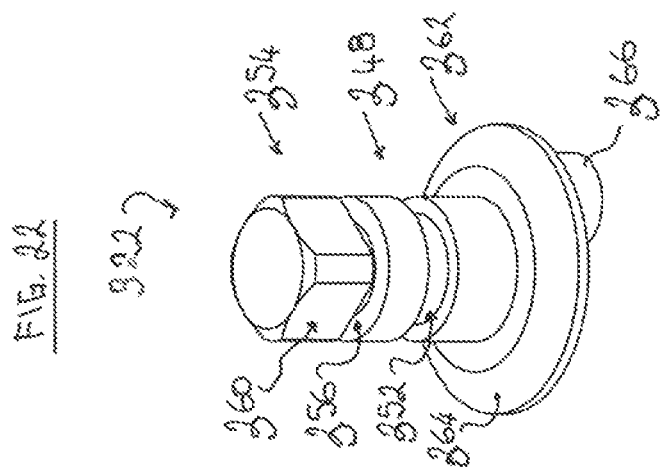
FIG. 22 is a first perspective view of the cam member of the drain valve shown in FIG. 20.
Figure 23:
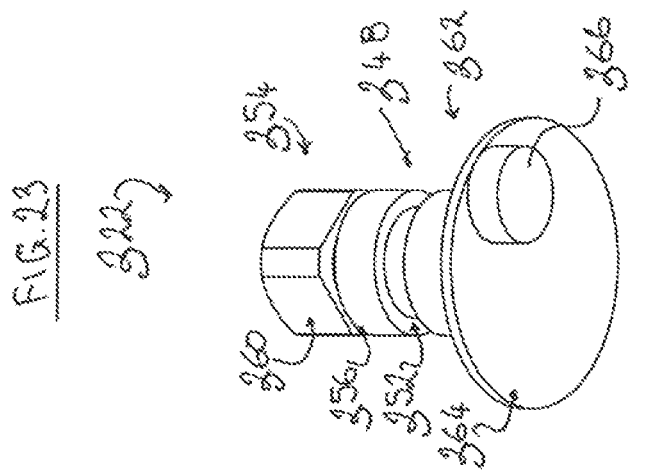
FIG. 23 is a second perspective view of the cam member of the drain valve shown in FIG. 20.
Figure 24:
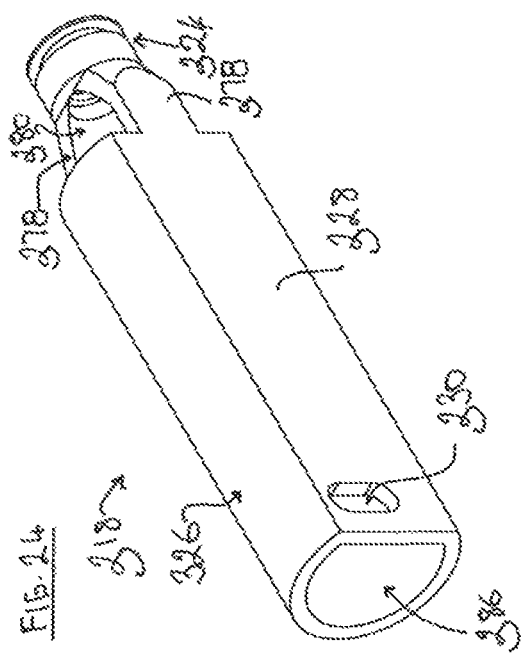
FIG. 24 is a first perspective view of the piston member of the drain valve shown in FIG. 20.
Figure 25:
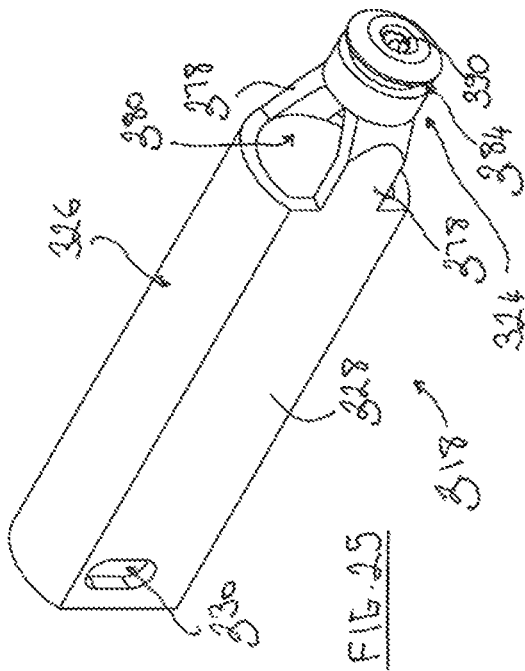
FIG. 25 is a second perspective view of the piston member of the drain valve shown in FIG. 20.
Figure 27:
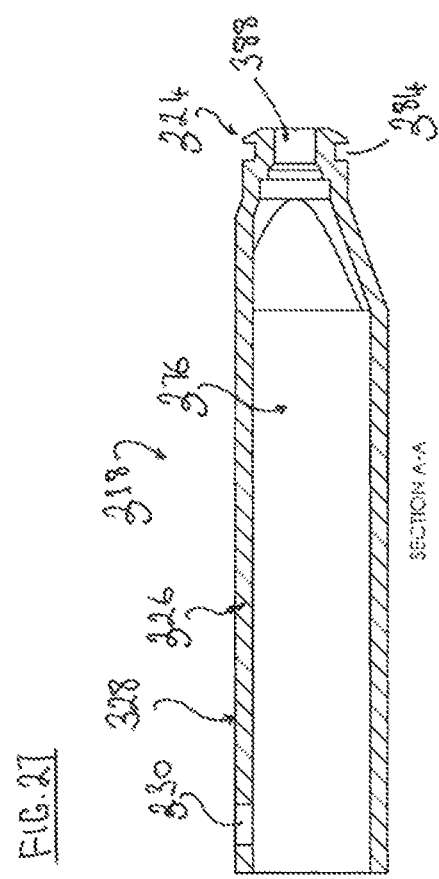
FIG. 27 is a cross sectional view of the piston member taken along the line E-E in FIG. 26.
Figure 26:
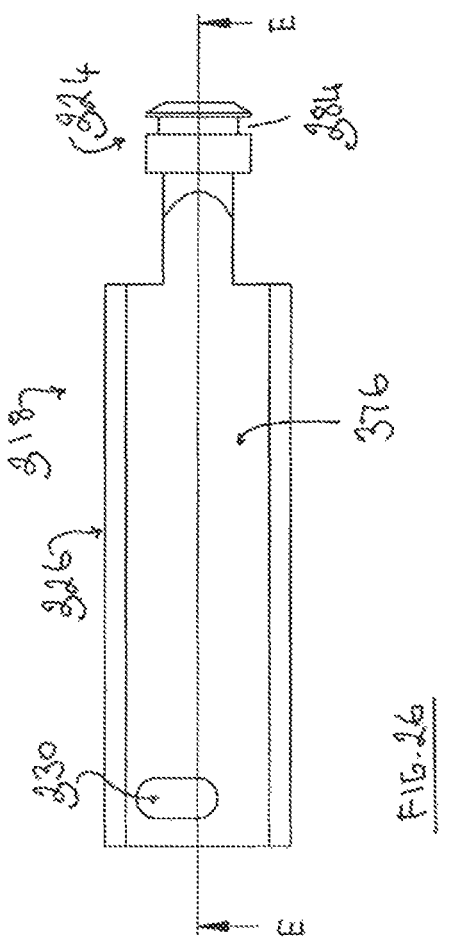
FIG. 26 is a side view of the piston member shown in FIGS. 24 and 25.

In FIGS. 17 to 19, there is shown a second embodiment of a drain valve 100. The drain valve 100 is similar to the drain valve 10, of the first embodiment, except that the seal 46 on the piston head 24 is angled. Thus, a plane sliced through the seal 46 would be at a non-perpendicular (i.e. non 90° angle to the longitudinal axis of the piston shaft 26. In contrast, a plane sliced through the seal 46 on the piston head 24 of the drain valve 10, of the first embodiment, would be substantially perpendicular (i.e. substantially 90° to the longitudinal axis of the piston shaft 26 of the drain valve 10 of the first embodiment.

Providing the seal 46 at an angle on the piston head 24 provides a more gradual unseating of the piston head 24 from the seat 20 when the drain valve 100 is opened. This results in the water exiting the drain valve 100 relatively slowly at first when the opening commences, and then the flow of water increases as the opening proceeds. In contrast, in the drain valve 10 of the first embodiment, the exiting flow of water is more immediate as soon as the opening of the drain valve 10 commences.

Thus, depending on the type of start flow of the water required, the appropriate drain valve 10 or 100 may be used.

The use and operation of the drain device 10 will now be described.

The drain valve 10 is used with a hot water storage unit.

Figure 15:
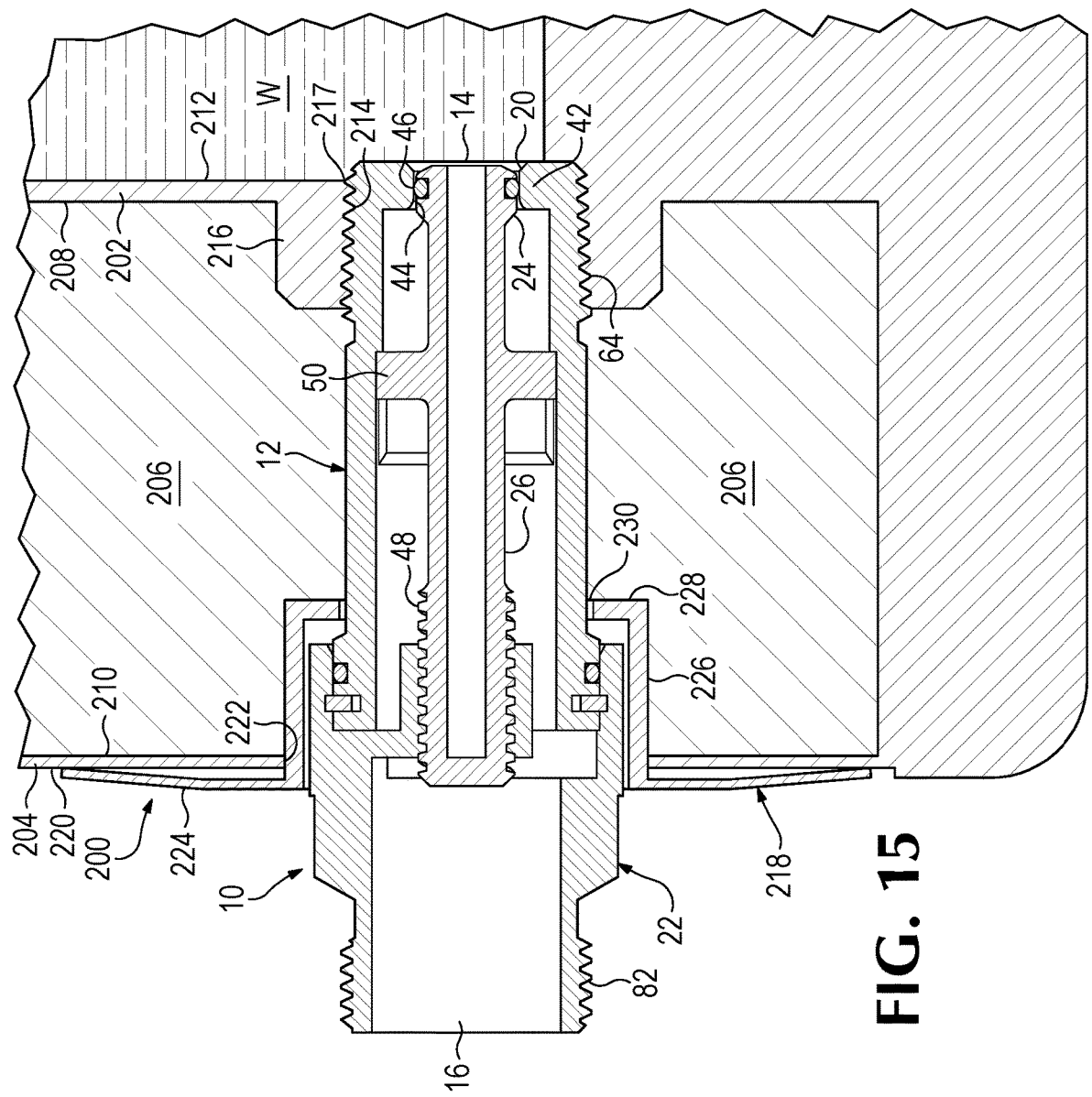
FIG. 15 is cross sectional side view of the drain valve shown in FIG. 1 installed in a hot water storage unit.
Figure 16:
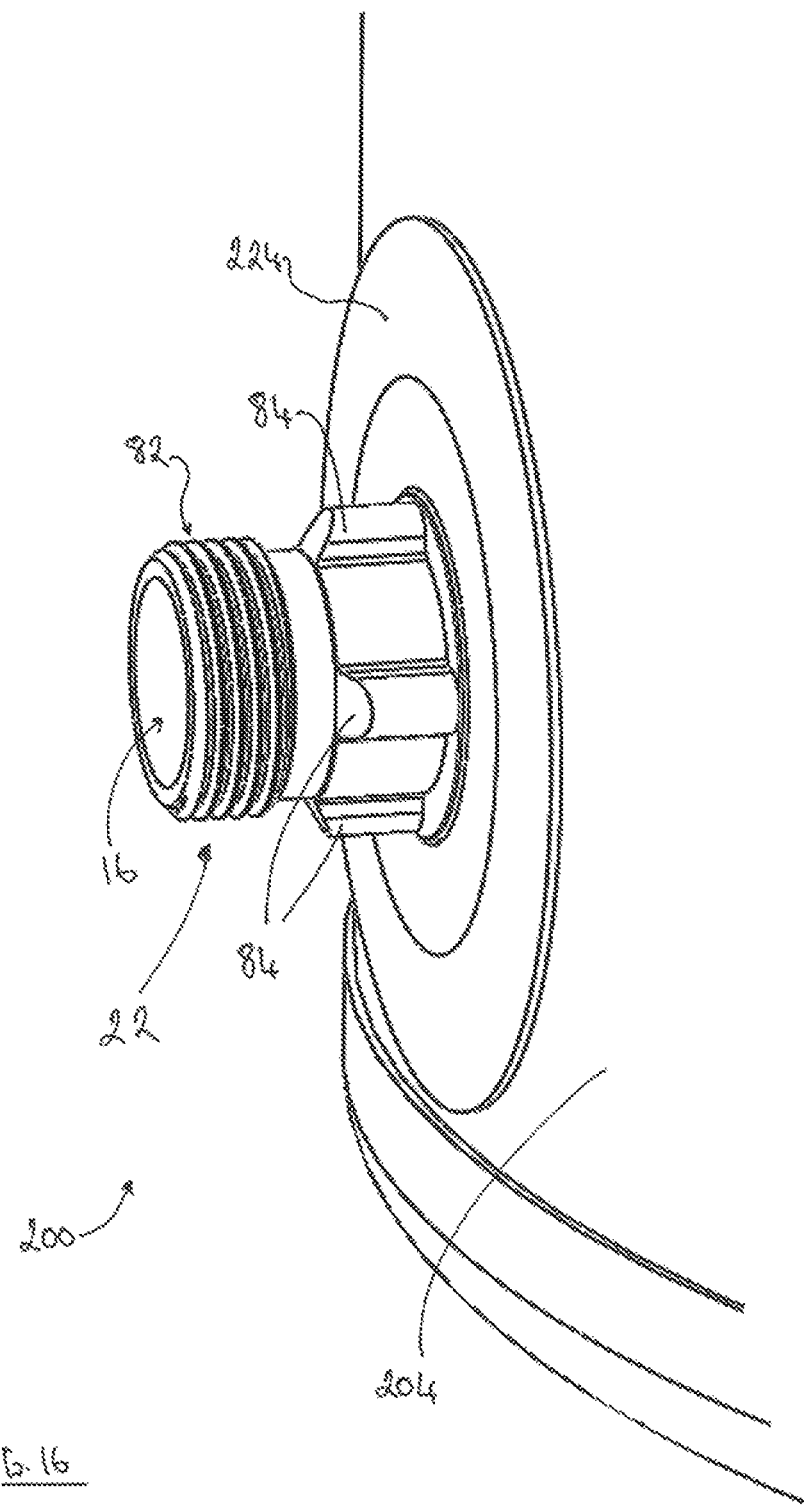
FIG. 16 is an external perspective view of the drain valve installed in a hot water storage unit, shown in FIG. 15.

In FIGS. 15 and 16, there is shown a portion of an embodiment of a hot water storage unit 200 in accordance with another aspect of the present invention. The hot water storage unit 200 comprises a vessel, also referred to as cylinder, 202, in which hot water (W) is storable, an outer casing 204 that encloses the vessel 202, and a drain valve 10.

Insulation material 206 is provided between the outer side, or outside, 208 of the vessel 202 and the inner side, or inside, 210 of the outer casing 204. The water W inside the vessel 202, is in contact with the surface of the vessel 202 at the inner side, or inside, 212 of the vessel 202.

A (female) screw thread 214 is formed in, or connected to, the wall of the vessel 202. The screw thread 214 is formed in a portion 216 that extends laterally, in an offset manner, from the wall of the vessel 202. The screw thread 214 surrounds an opening 217 in the vessel 202, to which the drain valve 10 may be connected as will be further herein described.

An escutcheon 218 extends from the outer side, or outside, 220 of the outer casing 204, through an opening in the outer casing 204 and into the inside of the outer casing 204. The escutcheon 218 frictionally engages with the edge of the opening formed in the outer casing 204, as indicated by reference numeral 222 in FIG. 15. The escutcheon 218 is surrounded by the insulation material 206.

The escutcheon 218 comprises a flange portion 224 and a tubular portion 226. The flange portion 224 abuts with the outer side 220 of the outer casing 204. The tubular portion 226 extends from the flange portion 224 and through the opening into the inside of the outer casing 204. An annular formation 228 is provided at the end of the tubular portion 226 inside of the outer casing 204. The annular formation 228 may alternatively be described as an inwardly turned flange, and has an opening 230.

The drain device 10 may be installed in the hot water storage unit 200. In accordance with standard plumbing practice, a suitable sealant (e.g. sealing tape, sealing string, a sealing compound) would first be applied to the screw thread 64 of the body 12. The first end 40 of the body 12 is inserted through the escutcheon 218 and the opening 230 in the annular formation 228 until the screw thread 64 on the body 12 engages with the screw thread 214 inside the hot water storage unit 200. The collar 22 is gripped by the lugs 84 and rotated in a first direction (clockwise).

As the collar 22 is rotated, one of the surfaces 80a/80b will contact the arcuate projection 62. At this point, any rotation of the collar 22 relative to the body 12 stops, and continued rotation of the collar 22 causes the screw thread 64 to fully engage with the screw thread 214. The connection between the screw threads 64 and 214 may be tightened with a tool, such as a wrench. This completes installation of the drain valve 10.

In the normal operating condition of the hot water storage unit 200, the drain valve 10 is in a closed condition (shown in FIGS. 5, 11 and 12) with the piston head 24 seated on the seat 20. In this position, the seal 46 contacts the circular surface 44 of annular formation 42. Water W cannot pass from the vessel 202 through the inlet 14 into the drain valve 10.

When it is required to open the drain valve 10 so that sludge build-up may be flushed from the vessel 202, the collar 22 is rotated in a second opposed direction. Since the body 12 is connected to the vessel 202, via the screw threads 64 and 214, the body is fixed and cannot rotate. In addition, since the ends 52 of the blades 50 are received in guide slots 54, the piston shaft 26 (and piston member 18) cannot rotate. Accordingly, rotation of the collar 22 in this manner causes the piston member 18 to move linearly in the direction O (i.e. in the axial direction of the piston shaft 26), from its position shown in FIG. 11 (closed condition of the drain valve 10) to its position shown in FIG. 13 (open condition of the drain valve 10). The blades 50 move along their respective guide slots 54, also in the direction O. Water W and sludge build-up are then able to pass from the vessel 202 and enter the drain device 10 via the inlet 14, since the piston head 24 is unseated from the seat 20. The water W and sludge build-up flow through the body 12 and pass into the collar 22, via the opening 66, and exit via the outlet 16.

The collar 22 is able to rotate in either direction (to open or close the drain valve 10) until one of the surfaces 80a or 80b abuts an end of the arcuate projection 62. In this way, the arcuate projection forms a stop for rotation of the collar 22, between an open condition and a closed condition of the drain valve 10.

Once the flushing operation has been completed, e.g. when the water W exiting (i.e. discharging) from the outlet 16 runs clear, the drain valve 10 may be closed. The drain valve 10 is returned to its closed condition by turning the collar in the opposite (second) direction. This causes the piston member 18 to move linearly in the chamber 38 in the direction C (i.e. in the axial direction of the piston shaft 26 and in the direction opposite to the direction O), shown in FIG. 11, until the piston head 24 seats on the seat 20. The blades 50 move along their respective guide slots 54, also in the direction C. In this position, the seal 46 contacts the circular surface 44 of annular formation 42. Water W cannot pass from the vessel 202 through the inlet 14 into the drain valve 10.

Figure 8:
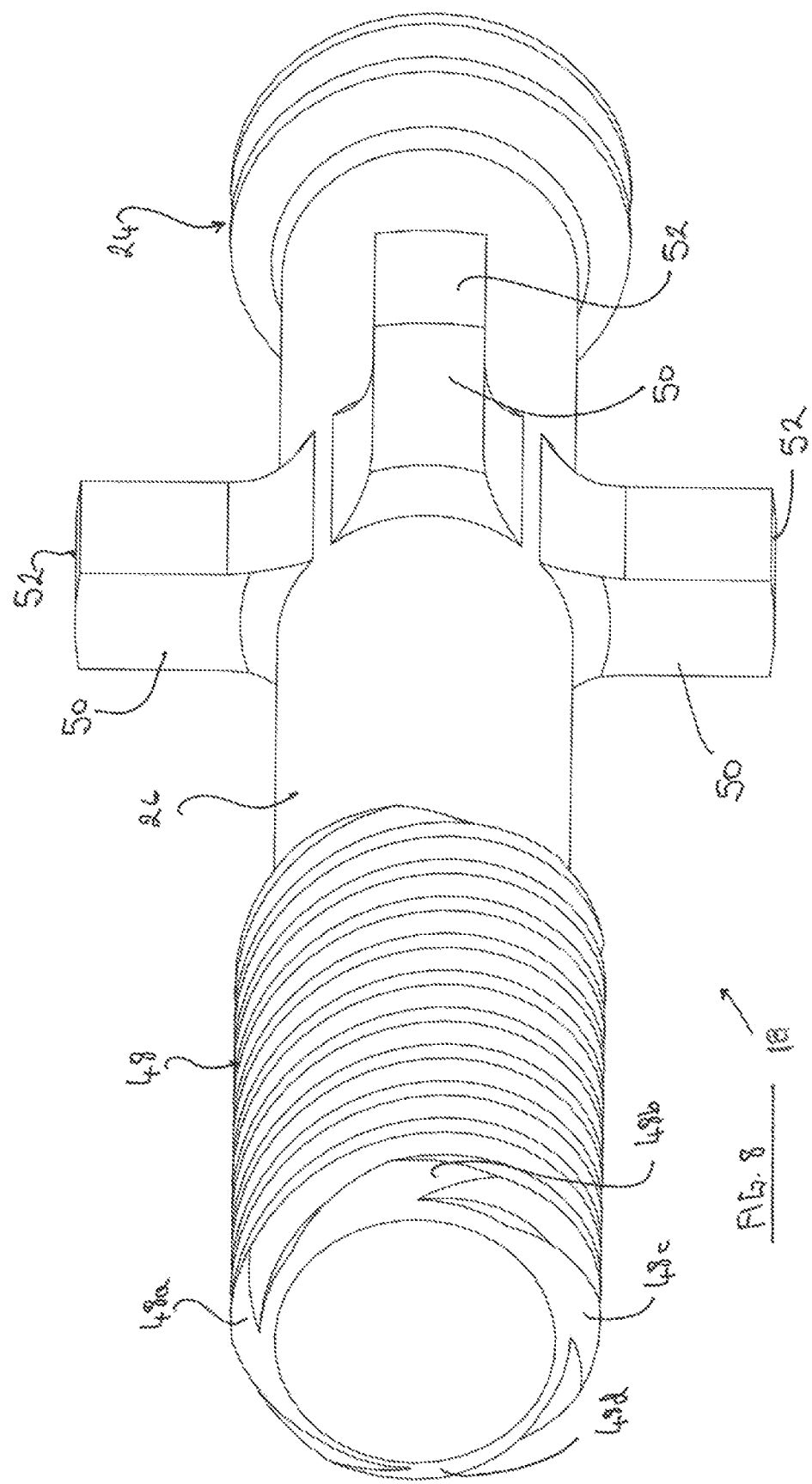
FIG. 8 is a perspective view of the piston member of the drain valve shown in FIG. 1.
Figure 9:
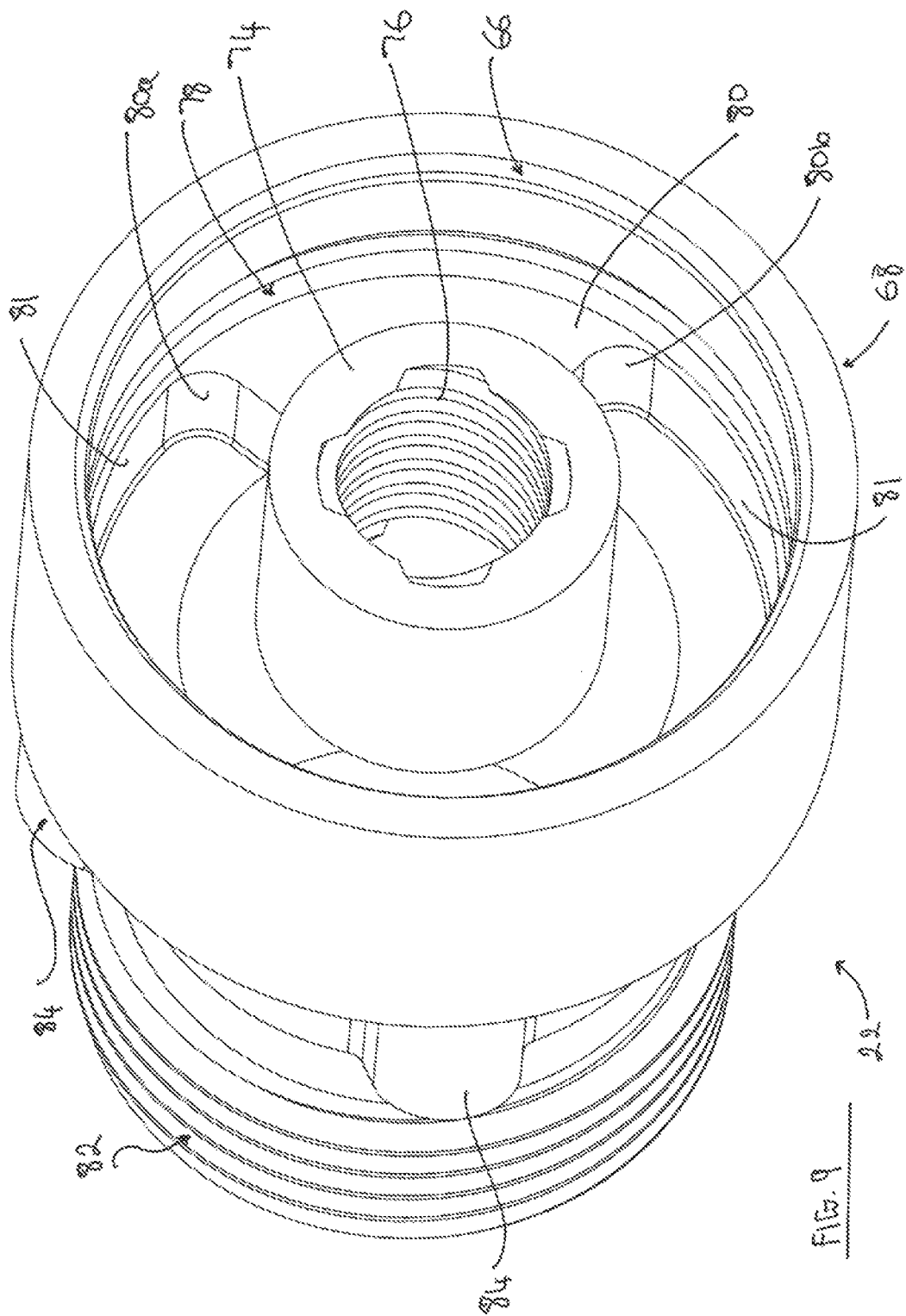
FIG. 9 is a perspective view of the collar of the drain valve shown in FIG. 1.
Figure 10:
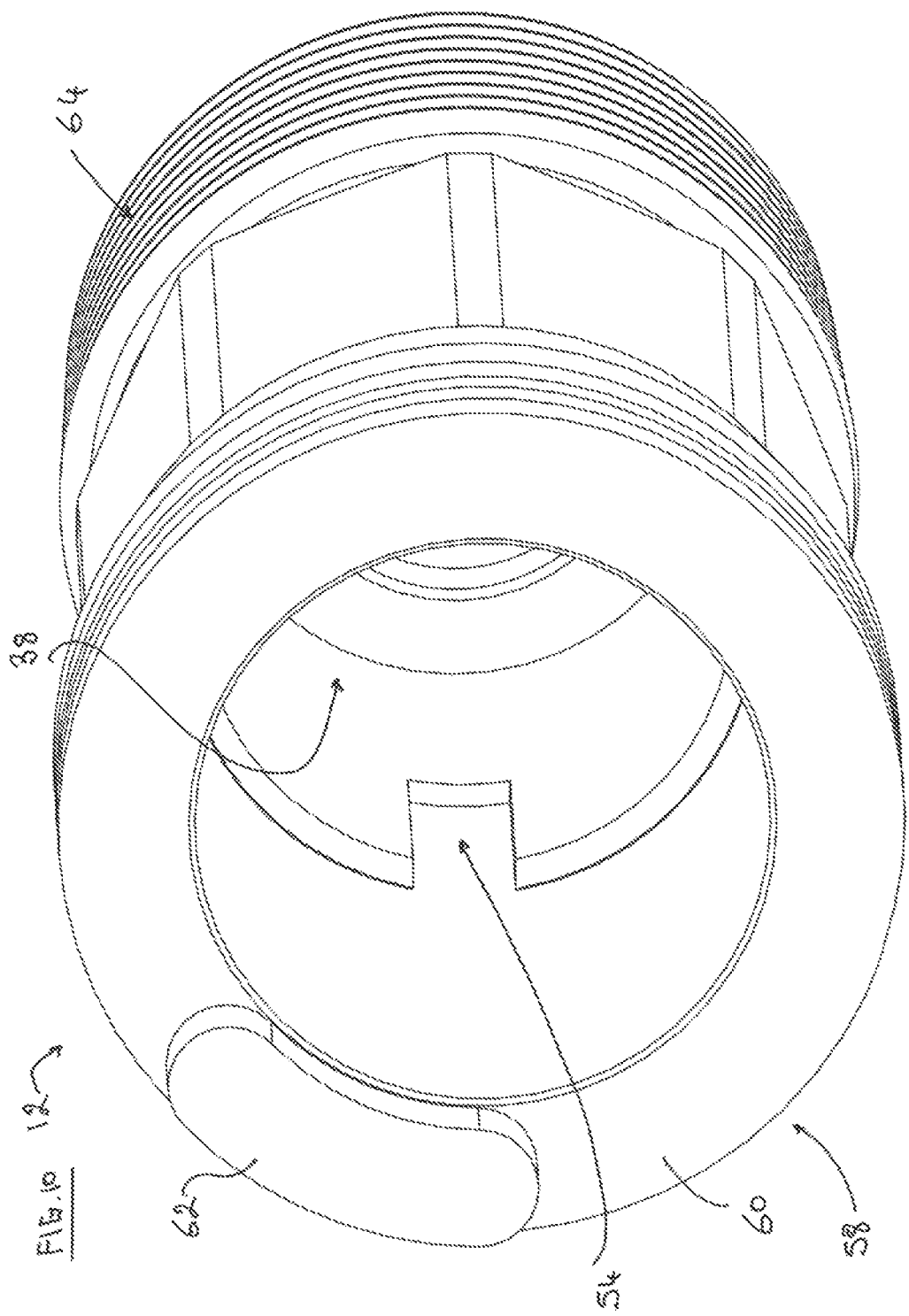
FIG. 10 a perspective view of the body of the drain valve shown in FIG. 1.
Figure 13:
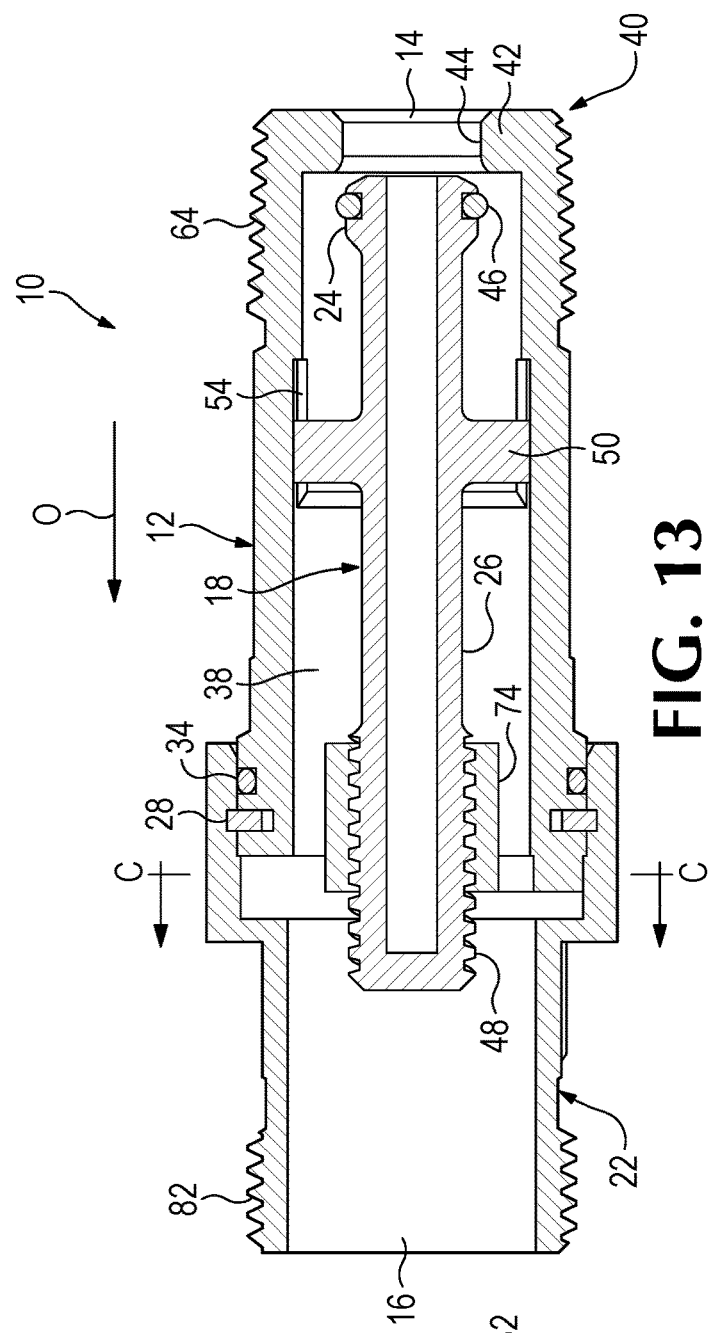
FIG. 13 is third cross sectional side view of the drain valve taken along the line A-A in FIG. 3, with the drain valve in the open condition.
Figure 14:
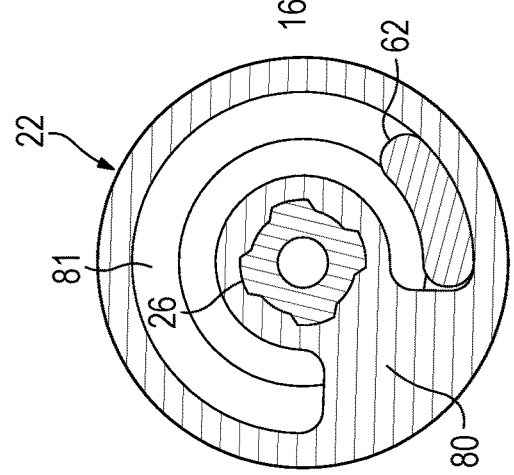
FIG. 14 is a cross sectional view of the drain valve taken along the line C-C in FIG. 13.

Having the four thread starts 48a, 48b, 48c and 48d, best seen in FIG. 8, on the piston shaft 26 provides an appreciable liner movement of the piston member 18 for a relatively small amount of rotation of the collar 22.

The collar 22 may be provided with external markings to show the direction in which the collar 22 should be rotated to open and close the drain valve 10.

When the drain valve 10 is installed in the hot water storage unit 200, the body 12 is located, or positioned, to be substantially behind the outer casing 204, i.e. on the inner side 210 of the outer casing 204, of the hot water storage unit 200. That is, the body 12 is located, or positioned, such that it is predominantly behind the outer casing 204, i.e. on the inner side 210 of the outer casing 204, of the hot water storage unit 200. Such positioning of the body 12 also means that it is located, or positioned, such that it is substantially, i.e. predominantly, behind the escutcheon 224, i.e. on the inner side 210 of the outer casing 204, of the hot water storage unit 200. This also applies to the components within the body 12 (for example, components such as the piston member 18, or at least the predominant portion of the piston member 18, the seal 20 and the inlet 14).

The body 12, and the components within the body 12 (for example, components such as the piston member 18, or at least the predominant portion of the piston member 18, the seat 20 and the inlet 14), are insulated by the insulation material 206, that is located between the vessel 202 and the outer casing 204. This insulation by the insulation material 206 reduces heat loss through the body 12 and through the components in the body 12. In addition, making the body 12 and piston member 18 of the drain valve 10 of polymer or other suitable plastics material also assists in reducing heat losses. On the other hand, making the collar 22 of brass (which is traditionally used for plumbing fittings) provides a high strength material for the portion of the drain valve 10 that is external to the outer casing 204. However, since the collar 22 is external of the vessel 202, the insulation material 206 and the outer casing 204, there is relatively little heat loss at this location.

Furthermore, when the drain valve 10 is installed in the hot water storage unit 200, the seat 20 is positioned substantially at the opening 217 of the vessel 202. Positioning the seat 20 at this location assists to minimise heat losses from the water W in the vessel 202 since, in the closed condition of the drain valve 10, the water W effectively cannot extend beyond the bounds of the wall of the vessel 202.

The drain valve 10 provides that, in the closed condition of the drain valve 10, the hot water W within the vessel 202 remains in the vessel 202 and no part of the water W is external of the vessel 202 which would expose it to heat loss through the body 12 of the drain valve 10.

Should the drain valve 10 ever required to be removed, it is first opened to drain all water W from the vessel 202. A tool such as a wrench is used to loosen the screw threads 64 and 214, and the drain valve 10 is rotated in the opposite direction to that for installation and the drain valve 10 may thereby be disconnected from the hot water storage unit 200.

The drain valve 100 of the second embodiment may be installed and operated in the same manner as herein before described with reference to the drain valve 10, except for the arrangement of the seal 46 on the piston head 24 as herein before described. Accordingly, the use and operation of the drain valve 100 will not be described. It is to be understood that the description of the use and operation of the drain valve 10 also applies to the drain valve 100.

In FIGS. 20 to 37, there is shown a drain valve 200 and various components of the drain valve 300. The drain valve 300 comprises a body 312, an inlet 314 for fluid to enter the drain valve 300, an outlet 316 for fluid to exit the drain valve 300, a piston member 318, a seat 320 and a rotatable member in the form of a spindle 322. The piston member 318 comprises a piston head 324 and a piston shaft, or stem, 326. The piston head 324 and the piston shaft 326 may be provide integrally, i.e. as a one-piece unit (as shown in the drawings). Alternatively, the piston head 324 and the piston shaft 326 may be made as separate components that are connected together, e.g. detachably connected together, such as by a screw threaded connection. The piston head 324 seats against the seat 320 in a closed condition of the drain valve 300. The piston head 324 is unseated from (i.e. spaced from) the seat 320 in an open condition of the drain valve 300.

The body 312 and the piston shaft 326 are substantially tubular in shape, with the body 312 being longer than the piston shaft 326.

Whilst the piston shaft 326 is substantially tubular in shape, it is not circular in profile. A portion 328 of the outer surface of the piston shaft 326 is flat such that the piston shaft is substantially D-shaped in profile. The flat portion 328 is provide with an opening 330. The opening 330 is provided near the end of the piston shaft 326 that is remote from the end near which the piston head 324 is located. The opening 330 is a slot opening, such that it is longer than it is wide. The longer dimension of the opening 330 is oriented in the direction substantially transverse to the longitudinal axis of the piston shaft 326 (which coincides with the line E-E in FIG. 26).

A shaped recess 332 surrounds an opening 334 is provided in the body 312. The body 312 is provided with a screw thread 336 that surrounds the opening 334. A grommet 338 is located in the opening 334. The grommet 338 is provided with a screw thread 340 that engages with the screw thread 336 of the body 212 to detachably retain the grommet 338 with the body 312. A seal, e.g. an O-ring 342, is provided between the grommet 338 and the body 312 at the periphery of the opening 334 to prevent fluid leaking from inside the body 312. The grommet 338 has a bore 344 extending therethrough. The bore 344 extends axially through the grommet 338. The grommet 338 is provided with hexagonal flat surfaces 346 that can be engaged by a suitable tool for removal and insertion of the grommet 338 from/into the opening 334. The shaped recess 332 provides clearance to use the tool.

A middle portion 348 of the spindle 322 (shown in FIGS. 21, 22 and 23) is received in the bore 344 of the grommet 338. A seal, e.g. an O-ring 350, is provided between the middle portion 348 of the spindle 322 and the wall of the bore 344 to prevent fluid leaking from inside the body 312. The O-ring 350 is located in a circumferential groove 352 in the middle portion 348. A portion (i.e. outer portion) 354 of the spindle 322 extends through the bore 344 to the exterior of the body 312. The spindle 322 is retained in position with the grommet 338 by a circlip 356 engaging in a circumferential groove 358 in the portion 354 of the spindle 322, exterior of the body 312. The outer portion 354 is provided with hexagonal flat surfaces 360 that can be engaged by a suitable tool to rotate the spindle about its axis to open and close the drain valve 300, as will be further herein described. A portion (inner portion) 362 of the spindle 322 is positioned in the interior of the body 312. The inner portion 362 is provided with a flange 364 such that it cannot pass through the bore 344. A projection 366 extends from the underside 368 of the flange 364, adjacent to the edge of the flange 364. The projection 366 is received in the opening 330. The projection 366 acts a cam, as will be further herein described.

The body 312 has a chamber 368. The chamber 368 is provided internally of the body 312 and forms an internal space. The piston member 318 is provided in the chamber 368. In this way, the body 312 provides a housing for the piston member 318.

The body 312 is provided with the inlet 314. The inlet 314 is provided at a first end 370 of the body 312. An annular formation 372 is provided at the first end 370 of the body 312. The annular formation 372 is integral with the body 312. The annular formation 372 may alternatively be described as an inwardly turned flange. The inlet 314 is provided as the opening of the annular formation 372.

The seat 320 is provided proximate to the inlet 314 of the drain valve 300.

In particular, the body 312 is provided with the seat 320. The seat 320 may be formed by the circular surface 374 of annular formation 372 of the body 312 such that the seat 320 is directly adjacent to the inlet 314.

The piston shaft 326 has a chamber 376. The chamber 376 is provided internally of the piston shaft 326 and forms an internal space. Web members 378 extend between the piston head 324 and the piston shaft 326. Openings 380 are formed between the web members 378.

The piston head 324 is provided proximate a first end of the piston shaft 326. The piston head 324 is provided with a seal 382. The seal 382 is in the form of an O-ring located in a groove 384 on the piston head 324. The seal 382 contacts the circular surface 374 annular formation 372 when the piston head 324 seats on the seat 320. An opening 386 is provided at the second end of the piston shaft 326, which is spaced from the first end of the piston shaft 326.

The piston head 324 is provided with a bore 388 therethrough. The bore 388 extends axially through the piston head 324. The wall of the bore 388 is provided with a screw thread 390. A plug 392, with a screw thread 394 at a first end thereof that engages with the screw thread 390 of the bore 388, closes the bore 388. This prevents fluid flowing through the bore 388 from the inlet 314. A seal, e.g. an O-ring 396, is provided between the wall of the bore 388 and the plug 392 to prevent fluid leaking into the chamber 376. A blind bore 400 is provided at the second end of the plug 392, spaced form the first end. The blind bore 400 has a shaped profile that can be engaged with a suitable tool to remove and reinsert the plug 392 as will be further herein described. In this way, the plug 392 is detachably connected to the piston head 324.

A (male) screw thread 402 is provided on the exterior of the body 312, adjacent to the inlet 314, and extends from the first end 370, part way along the body 12. The screw thread 402 is used to connect the drain valve 300 to a hot water storage unit, as will be further herein described.

A (male) screw thread 404 is provided on the exterior of the body 312, adjacent to the outlet 316, and extends from the second end 406, part way along the body 12. The screw thread 404 is used to connect the drain valve 300 to an external hose or fitting to direct away water exiting the drain valve 300.

The body 312 is provided with flat surfaces 408 (one of which can be seen in FIG. 20) which can be engaged with a suitable tool to connect, and disconnect, the drain valve 300 with a hot water storage unit.

The body 312 and spindle 322 may be made of brass. The piston member 318 may be made of polymer or other suitable plastics material. The plug 392 may be made of brass, or alternatively, of polymer or other suitable plastics material. The various seals may be silicone seals.

In an alternative embodiment, the drain valve 300 may be provided with a seal 382, on the piston head 324, that is angled, in a similar manner to the seal 46 of the piston head 24 of the drain valve 100 of the second embodiment 100.

The use and operation of the drain device 300 will now be described.

The drain valve 300 is used with a hot water storage unit.

Figure 38:
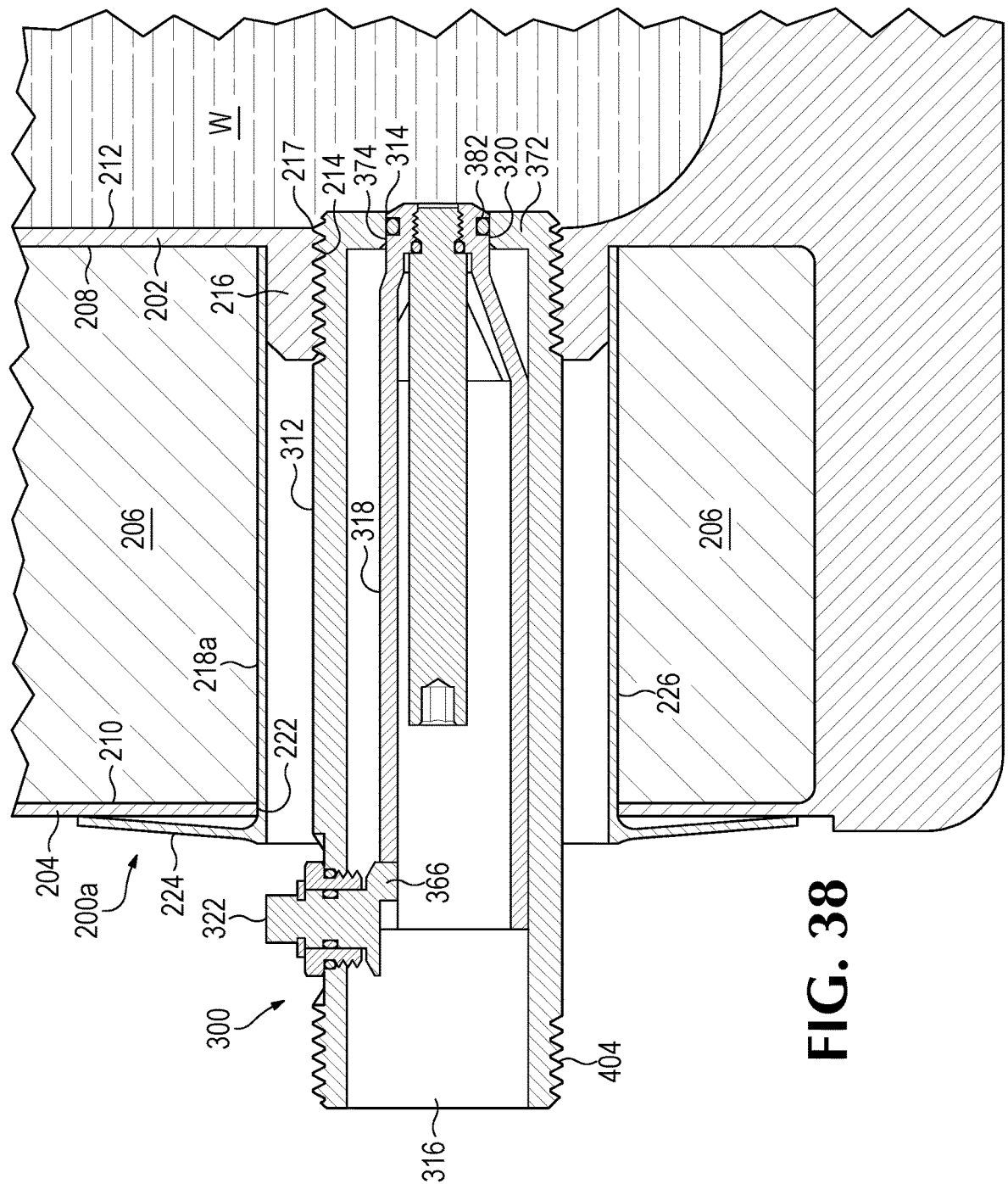
FIG. 38 is cross sectional side view of the drain valve shown in FIG. 20, in assembled condition, installed in a hot water storage unit.

In FIG. 38, there is shown a portion of an embodiment of a hot water storage unit 200a in accordance with another aspect of the present invention. The hot water storage unit 200a is similar to the hot water storage unit 200, herein before described. The hot water storage unit 200a comprises a vessel, also referred to as cylinder, 202, in which hot water (W) is storable, an outer casing 204 that encloses the vessel 202, and a drain valve 300.

The escutcheon 218a is different from the escutcheon 218 of the hot water storage unit 200 in that the tubular portion 226 of the escutcheon 218a extends from the outer side, or outside, 220 of the outer casing 204, through an opening in the outer casing 204 and into the inside of the outer casing 204, and then further extends to surround and frictionally engage with the portion 216 that extends laterally, in an offset manner, from the wall of the vessel 202. The escutcheon 218a is surrounded by the insulation material 206.

However, as an alternative, the escutcheon 218, as used in the hot water storage unit 200 may be used. Similarly, the escutcheon 218a may be used in the hot water storage unit 200.

The drain device 300 may be installed in the hot water storage unit 200a. In accordance with standard plumbing practice, a suitable sealant (e.g. sealing tape, sealing string, a sealing compound) would first be applied to the screw thread 402 of the body 312. The first end 370 of the body 312 is inserted through the escutcheon 218a until the screw thread 402 on the body 312 engages with the screw thread 214 inside the hot water storage unit 200a. The flat surfaces 408 on the body 312 are gripped by a suitable tool and the body 312 is rotated in a first direction (clockwise).

The body 312 is rotated until the connection between the screw threads 370 and 214 is tight and secure and the spindle 322 is facing upwards. This completes installation of the drain valve 300.

In the normal operating condition of the hot water storage unit 200a, the drain valve 300 is in a closed condition (shown in FIGS. 28 to 31) with the piston head 324 seated on the seat 320. As best seen in FIG. 31, the cam projection 366 abuts with a first end of the slot opening 330 and the seal 382 contacts the circular surface 374 of annular formation 372. Water W cannot pass from the vessel 202 through the inlet 314 into the drain valve 300.

When it is required to open the drain valve 300 so that sludge build-up may be flushed from the vessel 202, the spindle 322 is gripped with a suitable tool and rotated in a first direction. Rotation of the spindle 322 causes the cam projection 366 to move in an arcuate path. Since the cam projection 366 is engaged with the slot opening 330, the piston member 318 moves in a first (linear) direction such that the piston head 324 begins to unseat from the seat 320. This is best seen in FIG. 33, in which the piston head 324 has moved out of contact with the valve seat 320, which allows water W to begin to enter the drain valve 300 via the inlet 314. As the spindle 322 is further rotated in the first direction, the piston member 318 moves further in the first direction such that the piston head 324 is fully unseated and spaced from the seat 320. This is the fully open condition of the drain valve 300 and is shown in FIGS. 34 to 37.

In the open condition of the drain valve 300, water W and sludge build-up are able to pass from the vessel 202 and enter the drain valve 300 via the inlet 314, since the piston head 324 is unseated from the seat 320. The water W and sludge build-up are able to flow through the openings 380, through the chamber 376 in the piston shaft 326 and out through the opening 386 of the piston shaft 326, and also through the space 410 between the inside surface of the body 312 and the flat portion 328 of the outer surface of the piston shaft 326. The water W and sludge then flow out of the drain valve through the outlet 316.

Once the flushing operation has been completed, e.g. when the water W exiting (i.e. discharging) from the outlet 316 runs clear, the drain valve 300 may be closed. The drain valve 300 is returned to its closed condition by turning the spindle 322 in the opposite (second) direction. Since the cam projection 366 is engaged with the slot opening 330, the piston member 318 moves in a second (linear) direction to return the piston head 324 to its seated position with the seat 320, which is the closed condition of the valve 300. Water W cannot pass from the vessel 202 through the inlet 314 into the drain valve 300.

Since the cam projection 366 is engaged with the slot opening 330, the piston member 318 (and piston shaft 326) cannot rotate.

The spindle 322 may be provided with external markings to show the direction in which the spindle 322 should be rotated to open and close the drain valve 300.

In the event that the drain valve 300 is opened but no water W is discharged from the outlet 316, this may indicate that the opening 217 of the vessel 202 is blocked with sludge. In such circumstances, the plug 392 is removed by inserting a suitable tool through the outlet 316 into the blind bore and loosening the screw threads 390 and 394. Once the plug 392 has been removed, a piece of wire or other suitable implement, may be inserted through the bore 388 in the piston head 324 to loosen the sludge. Once the water W has started to flow through the bore 388, the plug 392 may be reinserted and the drain valve 300 operated as normal, i.e. as herein before described.

In an alternative, the piston shaft 26 of the drain valves 10 and 100, may be provided with a facility to clear away blockages of the opening 217 of the vessel. In that regard, as shown in the drawings of the drain valves 10 and 100, the piston shaft 26 is hollow from the piston head 24, but has a closed end adjacent the screw thread 48. That closed end may be provided with an opening which may be closed off, under normal conditions, with a removable screw, washer and washer. In the event that drain valve 10/100 is opened but no water W is discharged from the outlet 16, indicating that the opening 217 of the vessel 202 is blocked with sludge, the screw, washer and seal can be removed and a piece of wire or other suitable implement, may be inserted through the hollow piston shaft 26 and piston head 24 to loosen the sludge at the opening 217. Once the water W has started to flow through the piston shaft 26, the screw, washer and seal may be reinserted and the drain valve 10/100 operated as normal, i.e. as herein before described.

Should the drain valve 300 ever required to be removed, it is first opened to drain all water W from the vessel 202. A tool such as a wrench is used to loosen the screw threads 402 and 214, and the drain valve 300 is rotated in the opposite direction to that for installation and the drain valve 300 may thereby be disconnected from the hot water storage unit 200a.

The description of the positioning of the drain valve 10 behind the outer casing 204 of the hot water storage unit 200, its insulation by the insulation material 206 and the reduction in heat losses also applies to both the drain valve 100 of the second embodiment and the drain valve 300 of the third embodiment.

The drain valve according to the present invention provides a dry valve under normal operating conditions, i.e. when the drain valve is closed, and the valve contains only air. By a "dry valve", it is meant that there is no water in the drain valve, since the valve inlet is provided at the end of the valve. This is readily apparent from FIGS. 15 and 38.

The present invention provides that a drain valve may be factory-fitted at the time of manufacture of a hot water storage unit. In addition, the present invention provides that, alternatively, installation of the drain valve by the installer of the hot water storage unit is still possible, in the event that the manufacturer prefers to not factory-fit the drain valve. Both options are available to the manufacturer under the present invention and either option may be adopted without any adaptation or modification being required to the drain valve or remainder of the hot water storage unit.

Whilst one or more preferred embodiments of the present invention have been herein before described, the scope of the present invention is not limited to those specific embodiment(s), and may be embodied in other ways, as will be apparent to a person skilled in the art.

Modifications variations such as would be apparent to a person skilled in the art are deemed to be within the scope of the present invention.

The invention claimed is:

1. A drain valve, adapted to be connected to a hot water storage vessel of a hot water system, the drain valve comprising
    a body,
    an inlet for water to enter the drain valve,
    an outlet for water to exit the drain valve,
    a piston member provided in the body, the piston member having a piston head and a piston shaft,
    the piston shaft being hollow or having an internal space extending from the piston head to an opening of the piston shaft provided at an end of the piston shaft spaced from the piston head,
    a seat, against which the piston head seats in a closed condition of the drain valve, and
    a rotatable member that is rotatable relative to the body, the rotatable member rotatably retained with the piston shaft, such that rotation of the rotatable member in one direction causes the piston member to move, without rotation, in a first linear direction away from the inlet such that the piston head is unseated from the seat to open the drain valve and, in use, allow water to enter the drain valve via the inlet from an opening of the hot water storage vessel and discharge via the outlet, and rotation of the rotatable member in the opposite direction causes the piston member to move, without rotation, in a second linear direction toward the inlet to seat the piston head on the valve seat to close the drain valve and, in use, prevent water from entering the drain valve, from the hot water storage vessel, via the inlet of the drain valve,
    wherein the piston head is provided with a bore that extends axially through the piston head and wherein the bore in the piston head is closed with a removable closure in normal operation of the drain valve such that water cannot pass through the bore in the piston head into the hollow or internal space in the piston shaft in the normal operation of the drain valve, and wherein in the event that the drain valve is opened and no water is discharged from the outlet of the drain valve, indicating that the opening of the hot water storage vessel is blocked, the removable closure is removable to provide access, through the hollow or internal space in the piston shaft and the bore in the piston head, to the opening of the hot water storage vessel to clear the blockage using an implement inserted through the bore in the piston head, after which the bore in the piston head may be closed with the removable closure and the drain valve operated as normal, and wherein the rotatable member comprises a spindle, the spindle having a projection and an exterior portion that is provided at the exterior of the body, and wherein the piston shaft is provided with an opening, and wherein the projection of the spindle engages in the opening in the piston shaft and the exterior portion of the spindle is engageable at the exterior of the body to rotate the spindle such that rotation of the spindle in the first direction causes the piston member to move in the first linear direction to open the drain valve, and rotation of the spindle in the second direction causes the piston member to move in the second linear direction to close the drain valve.

2. A drain valve according to claim 1, wherein the spindle is rotatably held by a grommet that is detachably connected to the body of the drain valve.

3. A drain valve according to claim 1, wherein the piston shaft comprises a flat surface and the opening in the piston shaft is provided in the flat surface.

4. A drain valve according to claim 1, wherein openings are provided in the piston member between the piston head and the piston shaft for passage of fluid.

5. A hot water storage unit comprising
a hot water storage vessel, in which hot water is storable,
an outer casing enclosing the vessel,
insulation material provided between the vessel and the outer casing,
a hot water outlet for heated water to exit from inside the hot water storage vessel,
a drain valve according to claim 1, in use, to selectively allow water to be drained from the hot water storage vessel,
wherein the body of the drain device is located substantially behind the outer casing on the inner side of the outer casing to provide insulation to the body of the drain valve.

6. A hot water storage unit according to claim 5, wherein the inlet of the drain valve is provided substantially adjacent the opening of the hot water storage vessel.

7. A drain valve according to claim 1, wherein the removable closure comprises a plug that is located inside the piston shaft and removably engages with the bore in the piston head to close the bore in the normal operation of the drain valve such that water cannot pass through the bore in the piston head and into the hollow or internal space in the piston shaft in the normal operation of the drain valve.

* * * * *